United States Patent
Schepers et al.

(10) Patent No.: US 8,423,407 B2
(45) Date of Patent: *Apr. 16, 2013

(54) SYSTEM AND METHOD FOR AN ADAPTIVE SCHEDULING SYSTEM ARCHITECTURE

(75) Inventors: Trisha Schepers, Byron Center, MI (US); Stephen Falk, Grand Rapids, MI (US)

(73) Assignee: Andrew LLC, Hickory, NC (US)

( * ) Notice: Subject to any disclaimer, the term of this patent is extended or adjusted under 35 U.S.C. 154(b) by 1820 days.

This patent is subject to a terminal disclaimer.

(21) Appl. No.: 11/701,423

(22) Filed: Feb. 2, 2007

(65) Prior Publication Data

US 2008/0189178 A1 Aug. 7, 2008

(51) Int. Cl.
*G06Q 30/00* (2006.01)
(52) U.S. Cl.
USPC .......................... 705/14.43; 705/29; 705/14.4
(58) Field of Classification Search ................ 705/14.43, 705/29
See application file for complete search history.

(56) References Cited

U.S. PATENT DOCUMENTS

| | | | | |
|---|---|---|---|---|
| 5,584,050 A * | 12/1996 | Lyons | .......................... | 455/2.01 |
| 5,740,549 A * | 4/1998 | Reilly et al. | ................ | 705/14.42 |
| 5,892,535 A * | 4/1999 | Allen et al. | ...................... | 725/36 |
| 5,893,111 A * | 4/1999 | Sharon et al. | ................... | 707/688 |
| 5,999,912 A * | 12/1999 | Wodarz et al. | ............. | 705/14.61 |
| 6,198,906 B1 | 3/2001 | Boetje et al. | .................. | 455/3.01 |
| 6,338,043 B1 * | 1/2002 | Miller | ........................ | 705/14.69 |
| 6,714,975 B1 * | 3/2004 | Aggarwal et al. | ............. | 709/224 |
| 7,246,083 B2 * | 7/2007 | Bibelnieks et al. | ........ | 705/14.43 |
| 7,313,359 B2 * | 12/2007 | Steelberg et al. | ............. | 455/3.06 |
| 7,343,354 B2 * | 3/2008 | Hennessey | .................... | 705/400 |
| 7,363,302 B2 * | 4/2008 | Lester | ............................. | 725/42 |
| 7,428,555 B2 * | 9/2008 | Yan | ....................................... | 1/1 |
| 7,483,871 B2 * | 1/2009 | Herz | ..................................... | 1/1 |
| 7,650,617 B2 * | 1/2010 | Hoshino et al. | ................. | 725/34 |
| 7,668,950 B2 * | 2/2010 | Horowitz et al. | ............. | 709/223 |
| 7,685,019 B2 * | 3/2010 | Collins | ....................... | 705/14.42 |

(Continued)

OTHER PUBLICATIONS

Assmus, G., "An Adaptive Approach to Media Decisions" The Journal of the Operational Research Society, vol. 29, No. 6, Jun. 1978, pp. 593-601.*

(Continued)

*Primary Examiner* — Andre Boyce
*Assistant Examiner* — Tiphany Dickerson
(74) *Attorney, Agent, or Firm* — Duane Morris LLP

(57) ABSTRACT

The disclosed embodiments describe an automatic, adaptive system and method for efficiently and effectively scheduling advertising spots in commercial break locations across various networks, zones, channels, dates, times, and specific products, for example. The disclosed embodiments make use of fixed and relative factors, that may be user-defined, which assign a "cost" to one or more particular breaks which thereby allow for quick and accurate scheduling of spots. The "costs" may represent a value, or desirability, of a break for the advertiser and may be a function of both the fixed and relative factors. The fixed and relative factors may be configurable and may change for different advertising clients, different contract lines, different networks, different spot placement, etc.

The placement of spots may be accomplished through the use of an ordered list which may be generated based on a number of inputs that may be user-selected. A non-limiting example of user inputs may include: spot length, spot cost, contract line priority, beginning date/time of contract line, ending date/time of contract line, a predefined value index for the client, and contract line number, among others.

33 Claims, 31 Drawing Sheets

U.S. PATENT DOCUMENTS

| | | | | |
|---|---|---|---|---|
| 7,725,464 | B2* | 5/2010 | Grubb et al. | 707/723 |
| 7,877,290 | B1* | 1/2011 | Arsenault et al. | 705/14.4 |
| 7,895,076 | B2* | 2/2011 | Kutaragi et al. | 705/14.41 |
| 7,962,604 | B1* | 6/2011 | Morris et al. | 709/224 |
| 8,036,932 | B2* | 10/2011 | Cline et al. | 705/14.1 |
| 8,170,913 | B1* | 5/2012 | Baluja | 705/14.43 |
| 2001/0020236 | A1* | 9/2001 | Cannon | 707/1 |
| 2001/0034763 | A1* | 10/2001 | Jacobs et al. | 709/204 |
| 2001/0052000 | A1* | 12/2001 | Giacalone, Jr. | 709/218 |
| 2002/0002517 | A1* | 1/2002 | Fox | 705/29 |
| 2002/0128904 | A1* | 9/2002 | Carruthers et al. | 705/14 |
| 2002/0169659 | A1* | 11/2002 | Bollapragada et al. | 705/14 |
| 2002/0184047 | A1* | 12/2002 | Plotnick et al. | 705/1 |
| 2003/0058707 | A1* | 3/2003 | Dilger et al. | 365/200 |
| 2003/0067554 | A1* | 4/2003 | Klarfeld et al. | 348/461 |
| 2003/0070167 | A1* | 4/2003 | Holtz et al. | 725/32 |
| 2003/0110171 | A1* | 6/2003 | Ozer et al. | 707/10 |
| 2003/0177490 | A1* | 9/2003 | Hoshino et al. | 725/34 |
| 2003/0200128 | A1* | 10/2003 | Doherty | 705/8 |
| 2004/0003397 | A1* | 1/2004 | Boston et al. | 725/34 |
| 2004/0181802 | A1* | 9/2004 | Bollapragada et al. | 725/36 |
| 2004/0193488 | A1* | 9/2004 | Khoo et al. | 705/14 |
| 2004/0210929 | A1* | 10/2004 | Bollapragada et al. | 725/32 |
| 2004/0216157 | A1* | 10/2004 | Shain et al. | 725/42 |
| 2005/0049915 | A1* | 3/2005 | Mehta et al. | 705/14 |
| 2005/0071224 | A1* | 3/2005 | Fikes et al. | 705/14 |
| 2007/0073583 | A1* | 3/2007 | Grouf et al. | 705/14 |
| 2007/0113244 | A1* | 5/2007 | Verschueren et al. | 725/35 |
| 2007/0150348 | A1* | 6/2007 | Hussain et al. | 705/14 |
| 2007/0169145 | A1* | 7/2007 | Ko et al. | 725/35 |
| 2007/0271134 | A1* | 11/2007 | Ferry et al. | 705/14 |
| 2008/0022301 | A1* | 1/2008 | Aloizos | 725/34 |
| 2009/0006145 | A1* | 1/2009 | Duggal et al. | 705/6 |

OTHER PUBLICATIONS

Bollapragada, S., et al., "NBC's Optimization System Increase Revenues and Productivity" Interfaces, vol. 32, No. 1, Jan.-Feb. 2002, pp. 47-60.*

Bollapragada, S., et al., "Scheduling Commercials on Broadcast Television" Operations Research, vol. 52, No. 3, May-Jun. 2004, pp. 337-345.*

Cherry, Guy, Adaptive Advertising: Definitions, Scenario and Standards, Communications Technology, vol. 24, Iss. 1, Jan. 2007.*

Collin, Will, "The Interface Between Account Planning and Media Planning: A Practitioner perspective" Marketing Intelligence & Planning, vol. 21, No. 7 (2003) pp. 440-445.*

Feldman, J., et al., "Budget Optimization in Search-Based Advertising Auctions" EC'07, Jun. 11-15, 2007, San Diego, CA.*

Krug, G., "Digital Spot Delivery" Broadcast Engineering, vol. 46, Iss. 7, Jul. 2004, p. 18-19.*

Reddy, S. et al., SPOT: Scheduling Programs Optimally for Television, Management Science, vol. 44, No. 1, Jan. 1998, pp. 83-102.*

Varian, H. R., "Position Auctions" International Journal of Industrial Organization, vol. 25, pp. 1163-1178. Available online Nov. 16, 2006.*

\* cited by examiner

Exemplary Scheduling Grid

|  | 501a | 501b | 501c | 501d | 501e | 501f | 501g | 501h |
|---|---|---|---|---|---|---|---|---|
| M 500a | | | | | | | | |
| T 500b | | | | | | | | |
| W 500c | | | | | | | | |
| T 500d | | | | | | | | |
| F 500e | | | | | | | | |
| S 500f | | | | | | | | |
| S 500g | | | | | | | | |
| | 01:15 | 03:45 | 07:05 | 10:45 | 12:15 | 14:30 | 19:30 | 21:15 |
| | Overnight | | Morning | | Afternoon | | Prime | |

Fixed Parameters Applied

| Day of Week "Costs" 502 | | Daypart "Costs" 503 | 01:15 503a | 03:45 503b | 07:05 503c | 10:45 503d | 12:15 503e | 14:30 503f | 19:30 503g | 21:15 503h |
|---|---|---|---|---|---|---|---|---|---|---|
| | | | 20 | 20 | 15 | 15 | 10 | 10 | 0 | 0 |
| 502a | M | 0 | 20 | 20 | 15 | 15 | 10 | 10 | 0 | 0 |
| 502b | T | 0 | 20 | 20 | 15 | 15 | 10 | 10 | 0 | 0 |
| 502c | W | 0 | 20 | 20 | 15 | 15 | 10 | 10 | 0 | 0 |
| 502d | T | 5 | 25 | 25 | 20 | 20 | 15 | 15 | 5 | 5 |
| 502e | F | 10 | 30 | 30 | 25 | 25 | 20 | 20 | 10 | 10 |
| 502f | S | 10 | 30 | 30 | 25 | 25 | 20 | 20 | 10 | 10 |
| 502g | S | 10 | 30 | 30 | 25 | 25 | 20 | 20 | 10 | 10 |
| | | | Overnight | | Morning | | Afternoon | | Prime | |

Figure 5b

| Daypart "Costs" | | 20 | 20 | 15 | 15 | 10 | 10 | 0 | 0 |
|---|---|---|---|---|---|---|---|---|---|
| 10 | S | 30 | 30 | 25 | 25 | 20 | 20 | 10 | 10 |
| 10 | S | 30 | 30 | 25 | 25 | 20 | 20 | 10 | 10 |
| 10 | F | 30 | 30 | 25 | 25 | 20 | 20 | 10 | 10 |
| 5 | T | 25 | 25 | 20 | 20 | 15 | 15 | 5 | 5 |
| 0 | W | 20 | 20 | 15 | 15 | 10 | 10 | 0 | 0 |
| 0 | T | 20 | 20 | 15 | 15 | 10 | 10 | 0 | 0 |
| 0 | M | 20 | 20 | 15 | 15 | 10 | 10 | 0 | 0 |
| Day of Week "Costs" | | 01:15 | 03:45 | 07:05 | 10:45 | 12:15 | 14:30 | 19:30 | 21:15 |
| | | Overnight | | Morning | | Afternoon | | Prime | |

Figure 5c

First Spot Assigned, Relative Parameters Included

| | | 506a | 506b | 506c | 506d | 506e | 506f | 506g | 503 Daypart "Costs" | 507 Same Daypart "Costs" |
|---|---|---|---|---|---|---|---|---|---|---|
| 506 Same Day "Costs" | | 100 | 100 | 100 | 100 | 100 | 100 | 100 | | |
| 502 Day of Week "Costs" | | 0 | 0 | 0 | 5 | 10 | 10 | 10 | | |
| | | M | T | W | T | F | S | S | | |
| Overnight | 01:15 | 20 | 120 | 20 | 25 | 30 | 30 | 30 | 20 | 507a 50 |
| | 03:45 | 20 | 120 | 20 | 25 | 30 | 30 | 30 | 20 | 507b 50 |
| Morning | 07:05 | 15 | 115 | 15 | 20 | 25 | 25 | 25 | 15 | 507c 50 |
| | 10:45 | 15 | 115 | 15 | 20 | 25 | 25 | 25 | 15 | 507d 50 |
| Afternoon | 12:15 | 10 | 110 | 10 | 15 | 20 | 20 | 20 | 10 | 507e 50 |
| | 14:30 | 10 | 110 | 10 | 15 | 20 | 20 | 20 | 10 | 507f 50 |
| Prime | 19:30 | 50 | 150 | 50 | 55 | 60 | 60 | 60 | 0 | 507g 50 |
| | 21:15 | 50 | Spot 1 | 50 | 55 | 60 | 60 | 60 | 0 | 507h 50 |

Figure 5d

Desirability of Unassigned Breaks Changes, New Most and Least Desirable Breaks

| | | | | | Day of Week "Costs" | | | | | Daypart "Costs" 503 | Same Daypart "Costs" 507 |
|---|---|---|---|---|---|---|---|---|---|---|---|
| Same Day "Costs" 506 | | | M | T | W | T | F | S | S | | |
| | | | 0 | 0 | 0 | 5 | 10 | 10 | 10 | | |
| | 01:15 | Overnight | 100 | 100 | 100 | 100 | 100 | 100 | 100 | 20 | 50 |
| | 03:45 | | 20 | 120 | 20 | 25 | 30 | 30 | 30 | 20 | 50 |
| | 07:05 | Morning | 20 | 120 | 20 | 25 | 30 | 30 | 30 | 15 | 50 |
| | 10:45 | | 15 | 115 | 15 | 20 | 25 | 25 | 25 | 15 | 50 |
| | 12:15 | Afternoon | 10 | 110 | 10 | 20 | 25 | 25 | 25 | 10 | 50 |
| | 14:30 | | 10 | 150 | 10 | 15 | 20 | 20 | 20 | 10 | 50 |
| | 19:30 | Prime | 50 | Spot 1 ← 508 | 50 | 55 | 60 | 60 | 60 | 0 | 50 |
| | 21:15 | | 50 | | 50 | 55 | 60 | 60 | 60 | 0 | 50 |

| | Day of Week "Costs" 502 | M | T | W | T | F | S | S | Same Daypart "Costs" 507 |
|---|---|---|---|---|---|---|---|---|---|
| Same Day "Costs" 506 | | 0 | 0 | 0 | 5 | 10 | 10 | 10 | |
| | | 100 | 100 | 100 | 100 | 100 | 100 | 100 | Daypart "Costs" 503 |
| Overnight | 01:15 | 120 | 120 | 20 | 25 | 30 | 30 | 30 | 20 |
| | 03:45 | 120 | 120 | 20 | 25 | 30 | 30 | 30 | 20 |
| Morning | 07:05 | 115 | 115 | 15 | 20 | 25 | 25 | 25 | 15 |
| | 10:45 | 115 | 115 | 15 | 20 | 25 | 25 | 25 | 15 |
| Afternoon | 12:15 | 160 | 160 | 60 | 65 | 70 | 70 | 70 | 10 |
| | 14:30 | Spot 2 | 160 | 60 | 65 | 70 | 70 | 70 | 10 |
| Prime | 19:30 | 150 | 150 | 50 | 55 | 60 | 60 | 60 | 0 |
| | 21:15 | 150 | Spot 1 | 50 | 55 | 60 | 60 | 60 | 0 |

Second Spot Assigned, Additional Relative Parameters Included

Figure 5f

| | Same Day "Costs" 506 | Day of Week "Costs" 502 | | | | | | | | Daypart "Costs" 503 | Same Daypart "Costs" 507 |
|---|---|---|---|---|---|---|---|---|---|---|---|
| | 100 | 0 | M | 120 | 120 | 115 | 115 | 160 | Spot 2 | 150 | 150 | 20 | 50 |
| | 100 | 0 | T | 120 | 120 | 115 | 115 | 160 | 160 | 150 | Spot 1 ←508 | 20 | 50 |
| | 100 | 0 | W | 20 | 20 | 15 | 15 | 60 | 60 | 50 | 50 | 15 | 50 |
| | 100 | 5 | T | 25 | 25 | 20 | 20 | 65 | 65 | 55 | 55 | 15 | 50 |
| | 100 | 10 | F | 30 | 30 | 25 | 25 | 70 | 70 | 60 | 60 | 10 | 50 |
| | 100 | 10 | S | 30 | 30 | 25 | 25 | 70 | 70 | 60 | 60 | 10 | 50 |
| | 100 | 10 | S | 30 | 30 | 25 | 25 | 70 | 70 | 60 | 60 | 0 | 50 |
| | | | 01:15 | 03:45 | 07:05 | 10:45 | 12:15 | 14:30 | 19:30 | 21:15 | | 0 | 50 |
| | | | Overnight | | Morning | | Afternoon | | Prime | | | |

Desirability of Unassigned Breaks Changes, New Most and Least Desirable Breaks 515, 516, 517

Figure 5g

Third Spot Assigned, Additional Relative Parameters Included

| | | | | | | | | | Daypart "Costs" 503 | Same Daypart "Costs" 507 |
|---|---|---|---|---|---|---|---|---|---|---|
| | 100 | 100 | 100 | 100 | 100 | 100 | 100 | 100 | | |
| | 0 | 0 | 0 | 5 | 10 | 10 | 10 | 10 | | |
| | M | T | W | T | F | S | S | | | |
| | 120 | 120 | 120 | 25 | 30 | 30 | 30 | 30 | 20 | 50 |
| | 120 | 120 | 120 | 25 | 30 | 30 | 30 | 30 | 20 | 50 |
| | 165 | 165 | Spot 3 | 70 | 75 | 75 | 75 | 75 | 15 | 50 |
| | 165 | 165 | 165 | 70 | 75 | 75 | 75 | 75 | 15 | 50 |
| | 160 | 160 | 160 | 65 | 70 | 70 | 70 | 70 | 10 | 50 |
| | 160 | 160 | 160 | 65 | 70 | 70 | 70 | 70 | 10 | 50 |
| | Spot 2 | 150 | 150 | 55 | 60 | 60 | 60 | 60 | 0 | 50 |
| | 150 | Spot 1 | 150 | 55 | 60 | 60 | 60 | 60 | 0 | 50 |

| 01:15 | Overnight |
| 03:45 | |
| 07:05 | Morning |
| 10:45 | |
| 12:15 | Afternoon |
| 14:30 | |
| 19:30 | Prime |
| 21:15 | |

Same Day "Costs" 506
Day of Week "Costs" 502

Desirability of Unassigned Breaks Changes, New Most and Least Desirable Breaks

| | | | | | | | | | | Daypart "Costs" | Same Daypart "Costs" |
|---|---|---|---|---|---|---|---|---|---|---|---|
| Same Day "Costs" | Day of Week "Costs" | | M | T | W | T | F | S | S | | |
| 100 | 0 | 01:15 | 100 | 100 | 100 | 100 | 100 | 100 | 100 | 20 | 50 |
| 100 | 0 | 03:45 | 0 | 0 | 0 | 5 | 10 | 10 | 10 | 20 | 50 |
| 100 | 0 | 07:05 | 120 | 120 | 120 | 25 | 30 | 30 | 30 | 15 | 50 |
| 100 | 0 | 10:45 | 120 | 165 | 165 | 25 | 30 | 30 | 30 | 15 | 50 |
| 100 | 0 | 12:15 | 165 | 165 | Spot 3 | 70 | 75 | 75 | 75 | 10 | 50 |
| 100 | 0 | 14:30 | 160 | 160 | 165 | 70 | 75 | 75 | 75 | 10 | 50 |
| 100 | 0 | 19:30 | Spot 2 | 160 | 160 | 65 | 70 | 70 | 70 | 0 | 50 |
| 100 | 0 | 21:15 | 150 | 150 | 150 | 55 | 60 | 60 | 60 | 0 | 50 |
| | | | 150 | Spot 1 | 150 | 55 | 60 | 60 | 60 | | |

Overnight | Morning | Afternoon | Prime

Figure 5i

Fourth Spot Assigned, Additional Relative Parameters Included

| Same Day "Costs" | Day of Week "Costs" | | | | | | | | Daypart "Costs" | Same Daypart "Costs" |
|---|---|---|---|---|---|---|---|---|---|---|
| 100 | 0 | M | 170 | 170 | 165 | 165 | 160 | Spot 2 | 150 | 20 | 50 |
| 100 | 0 | T | 170 | 170 | 165 | 165 | 160 | 160 | 150 | Spot 1 | 20 | 50 |
| 100 | 0 | W | 170 | 170 | Spot 3 | 165 | 160 | 160 | 150 | 150 | 15 | 50 |
| 100 | 5 | T | 175 | Spot 4 | 170 | 170 | 165 | 165 | 155 | 155 | 15 | 50 |
| 100 | 10 | F | 100 | 10 | 80 | 80 | 75 | 75 | 70 | 70 | 60 | 60 | 10 | 50 |
| 100 | 10 | S | 80 | 80 | 75 | 75 | 70 | 70 | 60 | 60 | 10 | 50 |
| 100 | 10 | S | 80 | 80 | 75 | 75 | 70 | 70 | 60 | 60 | 0 | 50 |
|  |  | 01:15 | 03:45 | 07:05 | 10:45 | 12:15 | 14:30 | 19:30 | 21:15 |  |  |
|  |  | Overnight | | Morning | | Afternoon | | Prime | | | |

Figure 5j

Desirability of Unassigned Breaks Changes, New Most and Least Desirable Breaks

| | | | Same Daypart "Costs" 507 | 50 | 50 | 50 | 50 | 50 | 50 | 50 | 50 |
| | | | Daypart "Costs" 503 | 20 | 20 | 15 | 15 | 10 | 10 | 0 | 0 |
| | | S | | 100 | 10 | 80 | 80 | 75 | 75 | 70 | 70 | 60 | 60 |
| | | S | | 100 | 10 | 80 | 80 | 75 | 75 | 70 | 70 | 60 | 60 |
| | | F | | 100 | 10 | 80 | 80 | 75 | 75 | 70 | 70 | 60 | 60 |
| | | T | | 100 | 5 | 175 | Spot 4 | 170 | 170 | 165 | 165 | 155 | 155 |
| | | W | | 100 | 0 | 170 | 170 | Spot 3 | 165 | 160 | 160 | 150 | 150 |
| | | T | | 100 | 0 | 170 | 170 | 165 | 165 | 160 | 160 | 150 | Spot 1 |
| | | M | | 100 | 0 | 170 | 170 | 165 | 165 | 160 | Spot 2 | 150 | 150 |
| Same Day "Costs" 506 | Day of Week "Costs" 502 | | | 01:15 | 03:45 | 07:05 | 10:45 | 12:15 | 14:30 | 19:30 | 21:15 |
| | | | | Overnight | | Morning | | Afternoon | | Prime | |

Figure 5k

SYSTEM AND METHOD FOR AN ADAPTIVE SCHEDULING SYSTEM ARCHITECTURE

CROSS-REFERENCE TO RELATED APPLICATION

Cross-reference is hereby made to the patent application made simultaneously herewith and entitled "System and Method for an Adaptive Scheduling System Architecture", U.S. application Ser. No. 11/701,422 filed Feb. 2, 2007, which is incorporated herein in its entirety.

BACKGROUND

Current scheduling systems for placing commercial messages, sometimes referred to herein as "advertising spots" or "spots" in communication media such as television (e.g., broadcast, cable, etc.), radio (e.g., broadcast, satellite, etc.), wireless access (e.g., hand-held devices like personal digital assistants, cell phones, iPods, Blackberries, etc.) or other media, are incapable of meeting the burgeoning demand of new networks and channels for advertising or the plethora of advertising spots that need to be scheduled. Additionally, the complexity with which current advertising is designed to be scheduled is another factor that is stretching the limits of current scheduling systems.

Current scheduling systems, either manual or "automatic", typically rely on only a few inputs for determining when an advertising spot is to be scheduled, such as rate (cost) and contract line priority. As is known in the art, the cost of airing an advertising spot may vary depending on a number of factors, the most common being the day of the week and the time of the day the spot is aired. For example, a spot aired in "prime time" when the potential audience is large is more expensive than airing the spot during the middle of the night when the potential audience is smaller. Priorities in prior art scheduling systems are generally set and static and therefore require a large amount of time and effort to change. Additionally, if a higher-priority advertising spot were to try to be scheduled after a lower-priority spot was already scheduled, typical prior art systems typically would have to schedule the higher-priority spot around the lower-priority spot, thereby turning the priorities upside-down, or spend a lot of time and effort manually rearranging the schedule to account for the placement of the higher-priority spot. This is inefficient, ineffective, and expensive. Obviously, there is a need for an advertising spot scheduling system that can take into account more than two parameters, allow scheduling of multiple advertising spots on multiple forms of media, each having a large number of networks and/or channels, and be able to adapt to changing conditions.

The present disclosure takes into account the complexity inherent in current and future advertising scheduling systems and methods. For example, the present disclosure may make use of a ranking algorithm that ranks available commercial breaks in communication media program scheduling and may take into account a variety of factors, some fixed factors and some relative factors, as herein described, in performing such ranking. Furthermore, the selection of which factors to use and the weight given to each factor may be user-defined rather than preset by, for example, a network, a scheduling entity, or a governing body. By using a variety of factors, which may or may not be user-defined, the commercial break locations ("breaks") where spots are to be placed ("scheduled") may be tailored to better meet the needs of the advertiser.

Additionally, with the advent of cable television systems and the plethora of networks now available for viewers to watch, the prior art systems of manually scheduling spots or automatically scheduling spots according to fixed rules, becomes an intractable problem which the prior art systems cannot handle efficiently or effectively.

Accordingly, it is an object of the present disclosure to obviate the problems of the prior art and to provide a method and system of scheduling where an ordered list of advertising spots to be scheduled is provided where each spot has an associated scheduling factor, a first one of the spots is selected, one or more breaks for one or more networks are selected, a first cost for each of the breaks is determined as a function of a predetermined algorithm, and the first spot is assigned (i.e., "placed" or "scheduled") to one of the breaks which has a lowest first cost.

It is also an object of the present disclosure to provide a method and system of scheduling where an ordered list of spots is generated from a select group of spots to be scheduled, where each of the spots has an associated scheduling factor, and a first spot is selected and assigned to a first break chosen from multiple breaks as a function of a first cost assigned individually to each of the multiple breaks, where each of the first costs is a function of a predetermined fixed parameter. Additionally, if during the method of scheduling a second spot it is determined that no unassigned breaks have a second cost less than a predetermined amount thereby preventing the second spot from being assigned to one of the unassigned breaks, determining the relative rankings of the first and second spots and if the ranking of the second spot is greater than the ranking of the first spot, bumping the first spot from the first break and assigning the second spot to the first break. However, if the ranking of the second spot is not greater than the ranking of the first spot, place the second spot on an exceptions list to be placed later.

It is another object of the present disclosure to provide a computer program for scheduling where the computer program includes computer-readable code including program instructions for providing an ordered list spots to be scheduled where each spot has an associated scheduling factor, selecting a first one of the spots, providing multiple breaks for one or more networks, determining a first cost for each of the breaks as a function of a predetermined algorithm, and assigning the first spot to one of the breaks which has a lowest first cost.

It is a further object of the present disclosure to provide a system for scheduling including a database comprising (a) an ordered list of spots to be scheduled where each spot has an associated scheduling factor, and (b) a plurality of breaks for one or more networks, and a microprocessor operatively connected to the database, where the microprocessor comprises (a) circuitry for selecting a first spot, (b) circuitry for determining a first cost for each of the breaks as a function of a predetermined algorithm, and (c) circuitry for assigning the first spot to one of the breaks which has a lowest first cost. Alternatively, the circuitry for assigning the first spot may assign the first spot to one of the breaks that has a first cost less than a first predetermined amount. Additionally, the system for scheduling may include circuitry for removing the first spot from the ordered list of spots.

Furthermore, the system for scheduling may include circuitry for selecting a second spot, circuitry for determining a second cost for unassigned breaks as a function of the first cost and as a function of a predetermined relative parameter, and circuitry for assigning the second spot to one of the unassigned breaks which has wither a lowest second cost or a second cost that is less than a second predetermined amount. In addition, the circuitry for assigning the second spot may determine that no unassigned breaks have a second cost less than a second predetermined amount thereby preventing the second spot from being assigned to one of the unassigned breaks, and may determine that the second spot has a ranking greater than a ranking for the first spot, bumps the first spot from the first break, and assigns the second spot to the first break. Alternatively, the circuitry for assigning the second spot may determine that no unassigned breaks have a second cost less than a second predetermined amount thereby preventing the second spot from being assigned to one of the unassigned breaks, may determine that the second spot has a ranking less than a ranking for the first spot, and may place the second spot on an exceptions list, and may remove the second spot from the ordered list of spots. Additionally, the circuitry for assigning the second spot may assign the second spot to any one of the unassigned breaks. Still further, the system for scheduling may include circuitry for assigning advertising ("ad") copy to the spots.

It is yet another object of the present disclosure to provide a method and system for scheduling including prioritizing a list of networks for scheduling spots; determining if one or more networks on the list of networks requires spot scheduling such that (a) if none of the networks requires spot scheduling, displaying a network spot schedule, or (b) if one of the networks requires spot scheduling then (i) selecting a first network, (ii) obtaining scheduling information, (iii) generating an ordered list of spots, (iv) selecting a first contract line from the ordered list, where the first contract line contains one or more spots to be scheduled, and (v) selecting a first spot; based on the scheduling information, determining if one or more breaks on the selected network are acceptable for placing the first spot, where (a) if one or more acceptable breaks is determined to exist, scheduling the first spot in one of the acceptable breaks, or (b) if one or more acceptable breaks is determined to not exist then (i) determining if a bump candidate exists, (ii) if no bump candidate exists then logging the first spot as an exception, and (iii) if a bump candidate exists, bumping the bump candidate from its associated break, placing the bump candidate on the ordered list of spots, and scheduling the first spot in the break associated with the bump candidate; determining if there are any additional spots associated with the contract line where (a) if there are additional spots associated with the contract line, selecting a second spot from the first contract line and repeating the method for the second spot, or (b) if there are no additional spots associated with the first contract line, check and assign ad copy to all scheduled spots; and determining if there are additional contract lines, where (a) if there are additional contract lines, selecting a second contract line and repeating the method for the second contract line, or if there are no additional contract lines, placing spots logged as exceptions and repeating the method for a second network.

BRIEF DESCRIPTION OF THE DRAWINGS

FIGS. 5a through 5k illustrate an example of spot scheduling according to an embodiment of the disclosure.

DETAILED DESCRIPTION

Figure 1A:
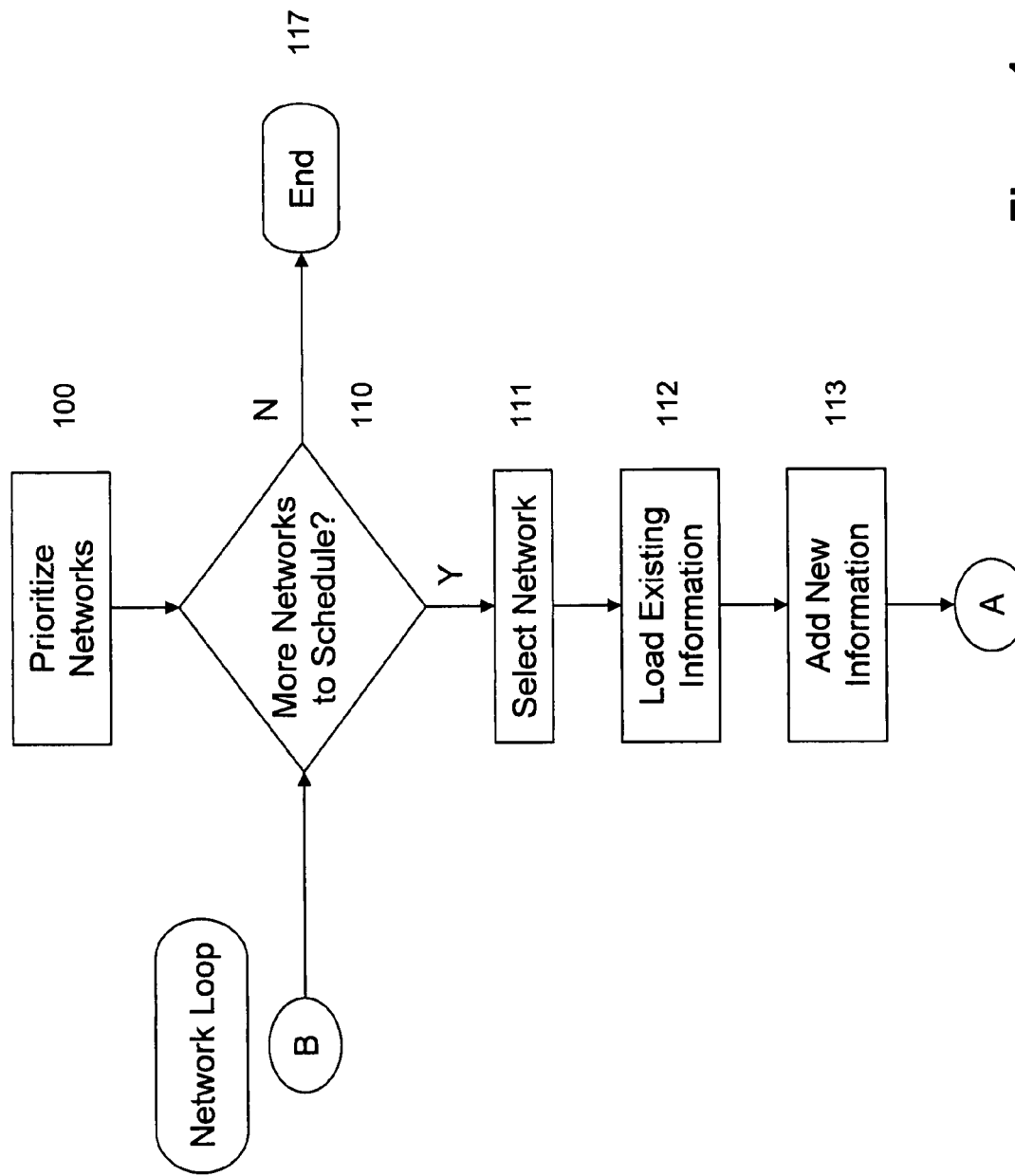
FIG. 1a is a first part of a flow diagram of a scheduling method according to an embodiment of the disclosure.

With the advent of communication signals being carried by, for example, cable systems, telephony networks, the interne and other computer networks, and satellite systems, for display to viewers via standard television interfaces, computer interfaces, and other non-standard television interfaces (e.g., personal digital assistants, cell phones, iPods, Blackberries, etc.), the opportunity and demand for scheduling advertising spots is ever increasing. In order to meet the demand, the disclosed embodiments describe a variety of systems and methods capable of efficiently and effectively scheduling spots in commercial break locations ("breaks") for the large number of networks for which spots need to be scheduled. The disclosed embodiments may make use of fixed and relative factors (sometimes referred to herein as "fixed parameters" and "relative parameters", respectively), that may be user-defined, in order to quickly and accurately schedule advertiser's spots at the dates, times, and for the channels that the advertisers desire.

The novel scheduling method, sometimes referred to herein as "Adaptive Scheduling", allows for a number of advantages not available in prior art manual and/or automatic scheduling systems, such as, for example, the elimination of traditional separate processes for roadblock scheduling (i.e., placing the same spot in the same break time for multiple channels so that viewers on the multiple channels each see the same spot), the ability for the advertiser to have a hand in setting the goals/costs of the advertising campaign; reducing manual scheduling of exceptions (i.e., spots that cannot be placed due to a lack of breaks meeting the advertiser's preferred scheduling criteria) due to a more effective placement of spots, and reducing the overall time required to schedule spots.

As further discussed herein, specifically with reference to FIGS. 5a through 5k, the fixed factors and the relative factors may be user-defined. Fixed factors and relative factors are "costs" assigned to a break. These "costs" may represent a value, or desirability of, a break for the advertiser. These factors may be used to achieve an appropriate vertical and horizontal rotation and overall spot placement. Fixed factors may be the same regardless of which spot is being placed. Relative factors may vary as spots are placed. The cost of a break may be a function of both the fixed and relative factors. The fixed and relative factors may be configurable and may change for different advertising clients, different contract lines, different networks, different spot placement, etc.

Additionally, the placement of spots may be accomplished through the use of an ordered list, sometimes referred to herein as an "Adaptive Scheduling Order by Clause" or an "AS Order by Clause", which may be generated based on a number of inputs that may be user-selected. A non-limiting example of user inputs may include: spot length, spot cost, contract line ranking, beginning date/time of contract line, ending date/time of contract line, a predefined value index for the client, ranking value, contract line number, etc. The AS Order by Clause may be used in the determination of the order in which spots are placed by, for example, ordering the various contract lines and/or ordering the various spots to be placed within one or more contract lines.

Figure 1B:
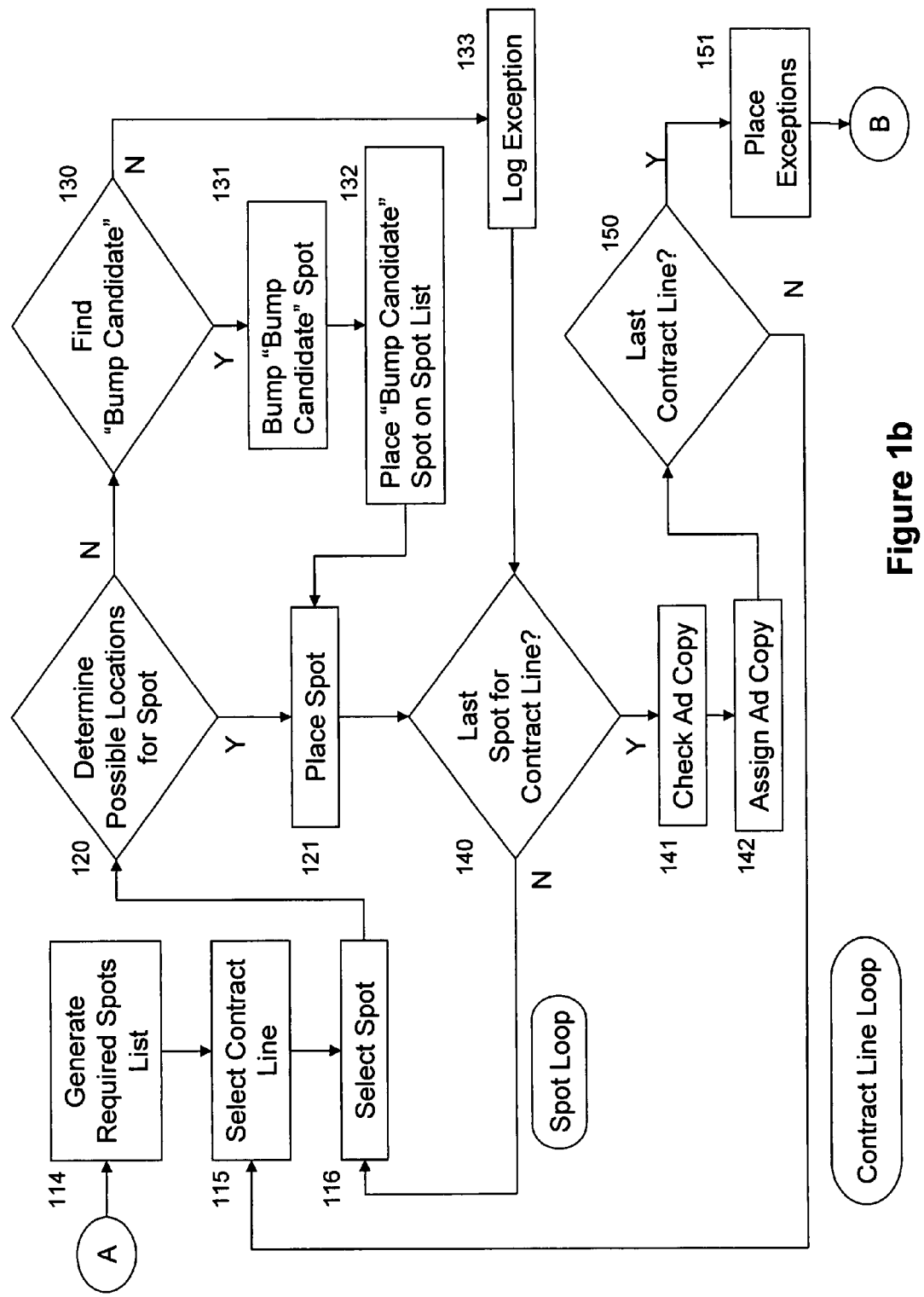
FIG. 1b is a second part of a flow diagram of a scheduling method according to an embodiment of the disclosure.

FIGS. 1a and 1b combined illustrate a method for scheduling spots according to an embodiment of the disclosure. The method may be carried out by a computer program executing programmable instructions on a microprocessor-based system. The method illustrated in FIGS. 1a and 1b may include three loops, as shown in the Figures, which may be referred to as the Network Loop, and Spot Loop, and the Contract Line loop. Referring now to FIG. 1a, at block 100 multiple networks for which spots are to be scheduled may be prioritized. At block 110, a decision may be made as to whether there are additional networks on which to schedule spots. If all the networks for which spots are to be scheduled have been scheduled, then the procedure may end and a display of the schedule for one or more of the networks may be created, printed out, stored, etc. If there are more networks for which spots need to be scheduled, at block 111 one of the networks that need to be scheduled is selected. At block 112 existing information may be accessed and/or loaded. This information may include, for example, the network's programming schedule, the available breaks, and any special events that may need to be taken into account. At block 113 new information may be accessed and/or loaded. This new information may include, for example, new programming for the network, Interconnect updates (where an Interconnect, as is known in the art, is an entity that may reserve a portion of the breaks for a given network or networks for the exclusive use by the Interconnect), etc. It will be understood by those of skill in the art that the above instances are only exemplary in nature and are not intended in any way to limit the disclosure.

Referring now to FIG. 1b, after block 113, the procedure goes to block 114 where a list of required spots may be generated. This list, sometimes referred to herein as an "ordered list" may be ordered and/or prioritized by a number of inputs, such as the aforementioned inputs for the AS Order by Clause. Once the ordered list is generated, at block 115 a contract line may be selected and at block 116 a spot may be selected from the selected contract line.

At block 120 a determination may be made regarding possible locations for the spot to be scheduled, i.e., a determination may be made as to which breaks meet the criteria for placement of the spot. The criteria may include fixed and relative parameters and/or other factors including, but not limited to, start/stop date and time for the spot, availability of the spot and/or break for scheduling, program name and/or type associated with the break, product type associated with the spot, product conflict with the name/type of program associated with the break, association between the product associated with the spot and the type of program associated with the break, minimum/maximum date/time separation between the spot and types of programs that may conflict with the spot, separation between the client's spot and a spot placed by another client, etc. The fixed and relative parameters may be taken into account in this step of the procedure as will be discussed in more detail below with respect to FIGS. 5a through 5k. If one or more of the breaks meets the criteria for placing the spot, the spot is placed in one (or more) of the breaks at block 121. If none of the breaks meet the criteria for placing the spot, then a "bump candidate" is sought at block 130. A bump candidate may be a placed spot that has a lower ranking than the current spot to be placed. Additionally, the bump candidate may be placed in a break that meets the criteria for the current spot to be placed. Alternatively, the bump candidate may be placed in a break that is a predetermined amount below the minimum criteria for the current spot to be placed. If a bump candidate is found, then at block 131 the bump candidate may be bumped, i.e., removed from the break it currently occupies, at block 132 the bump candidate may be placed on the spot list (the ordered list) to be selected for scheduling later, and at block 121 the current spot to be placed may be placed in the break that was occupied by the bump candidate. If a bump candidate is not found, then the current spot to be placed is entered onto an exceptions list so that the current spot may be placed, for example, in the best available break as discussed below.

At block 140, a determination is made as to whether the spot that was placed or entered onto the exceptions list is the last spot for the current contract line. If the placed/excepted spot is not the last spot for the current contract line, then the next spot for the current contract line is selected at block 116 (thereby closing the Spot Loop) and the above procedure may be repeated for this newly-selected spot. If the placed/excepted spot is the last spot for the current contract line, then advertising copy is checked at block 141 and advertising copy is assigned at block 142, as is known in the art, for each of the spots on the current contract line.

At block 150, a determination is made as to whether the current contract line is the last contract line having spots that need to be scheduled. If the current contract line is not the last contract line having spots that need to be scheduled, then the next contract line is selected at block 115 (thereby closing the Contract Loop) and the above procedure may be repeated for this newly-selected contract line. If the current contract line is the last contract line having spots that need to be scheduled, then those spots on the exception list, such as the spots placed on the exception list in block 133 above, may be placed at block 151. After the excepted spots are placed, a determination is made at block 110 as to whether there are additional networks for which spots need to be scheduled. If there are additional networks for which spots need to be scheduled, a new network is selected at block 111 (thereby closing the Network Loop) and the above procedure may be repeated for this newly-selected network. If there are no additional networks for which spots need to be scheduled, then the procedure may end at block 117 and a display of the schedule for one or more of the networks may be created, printed out, stored, etc., as discussed above.

Figure 2:
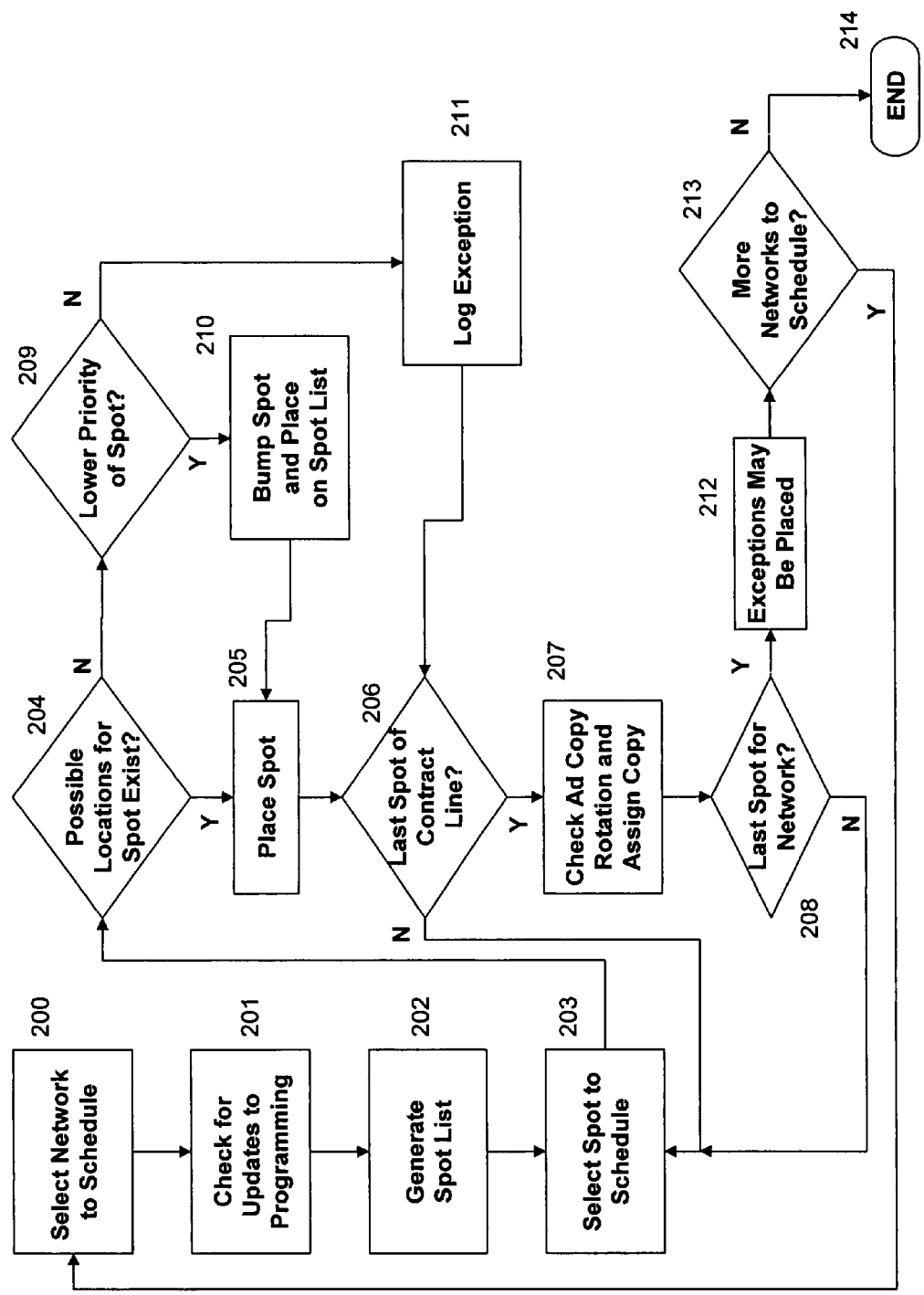
FIG. 2 is a flow diagram of a scheduling method according to an embodiment of the disclosure.

With reference now to FIG. 2, a different embodiment of a system and method for scheduling spots is disclosed. At block 200 a network for scheduling spots is selected. At block 201, existing and new information and updates for programming on the network are checked and added for decision making. At block 202, a spot list is generated, similar to the "ordered list" discussed above with respect to FIGS. 1a and 1b. At block 203, a spot is selected for scheduling. At block 204, possible locations (i.e., breaks) for the spot to be placed are determined. If possible breaks exist, the spot may be placed in one or more of the possible breaks at block 205. If possible breaks do not exist, at block 209 a determination is made as to whether lower ranking spots are already scheduled in one or more breaks that meet the criteria for placing the current spot (i.e., the lower ranking spot(s) occupies a break(s) that meets the needs for scheduling the current spot or is sufficiently close to meeting the needs for the scheduling the current spot). If a lower ranking spot is scheduled in a break that meets the criteria for placing the current spot, at block 210 the lower ranking spot may be bumped and may be placed on the spot list for later scheduling, and at block 205 the current spot may be place in the now vacant break. If a lower ranking spot is not scheduled in a break that meets the criteria for placing the current spot, then at block 211 the current spot may be added to an exceptions list (and may be removed from the spot list).

At block 206, a determination may be made as to whether the placed/excepted spot is the last spot to be scheduled for a particular contract line. If the placed/excepted spot is not the last spot to be scheduled for a particular contract line, then at block 203 another spot is selected for scheduling and the above procedure may be repeated for this newly-selected spot. If the placed/excepted spot is the last spot to be scheduled for a particular contract line, then at block 207 advertising copy rotation is checked and advertising copy may be assigned to the spots for the particular contract line, as is known in the art.

At block 208, a determination is made as to whether there are additional spots to be scheduled for the current network. If there are additional spots to be scheduled for the current network, then at block 203 another spot is selected for scheduling and the above procedure may be repeated for this newly-selected spot. If there are no additional spots to be placed for the current network, at block 212 the exceptions (e.g., from the exceptions list at block 211 above) may be placed. At block 213, a determination is made as to whether there are additional networks for which spots need to be scheduled. If there are additional networks for which spots need to be scheduled, then a network is selected for scheduling at block 200 and the above procedure may be repeated for this newly-selected network. If there are no further networks for which spots need to be scheduled, then the procedure may end at block 214 and a display of the schedule for one or more of the networks may be created, printed out, stored, etc., as discussed above.

Figure 3A:
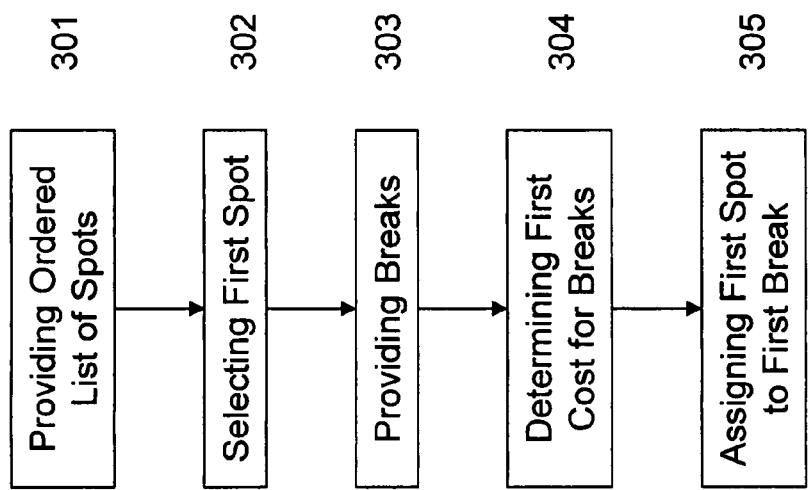
FIG. 3a is a flow diagram of a scheduling method according to an embodiment of the disclosure.

With attention now directed to FIGS. 3a through 3f, these figures represent a set of embodiments of the present disclosure, such as may be implemented in hardware, software, computer programs, circuitry, methodologies, etc., where like reference numbers refer to like components/procedural stages. In FIG. 3a, an ordered list of spots may be provided at block 301. The ordered list of spots may be provided using an AS Order by Clause as described elsewhere herein. At block 302 a first spot may be selected from the ordered list. At block 303, breaks for scheduling the first spot may be provided. At block 304, a first cost for each of the breaks may be determined. At block 305 the first spot may be assigned to one (or more) of the breaks, i.e., the "first break". The assignment of the first spot to the first break may be made with respect to fixed and/or relative parameters as discussed herein.

Figure 3B:
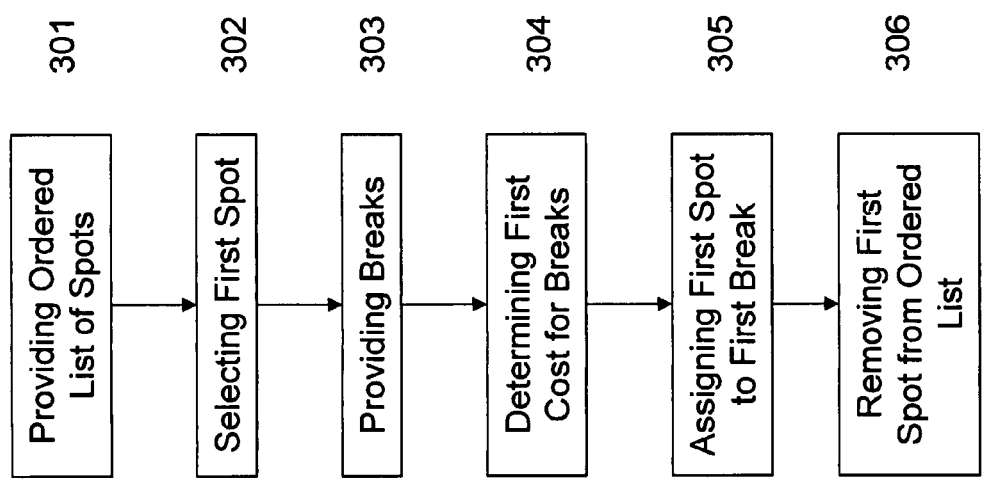
FIG. 3b is a flow diagram of a scheduling method according to an embodiment of the disclosure.
Figure 3C:
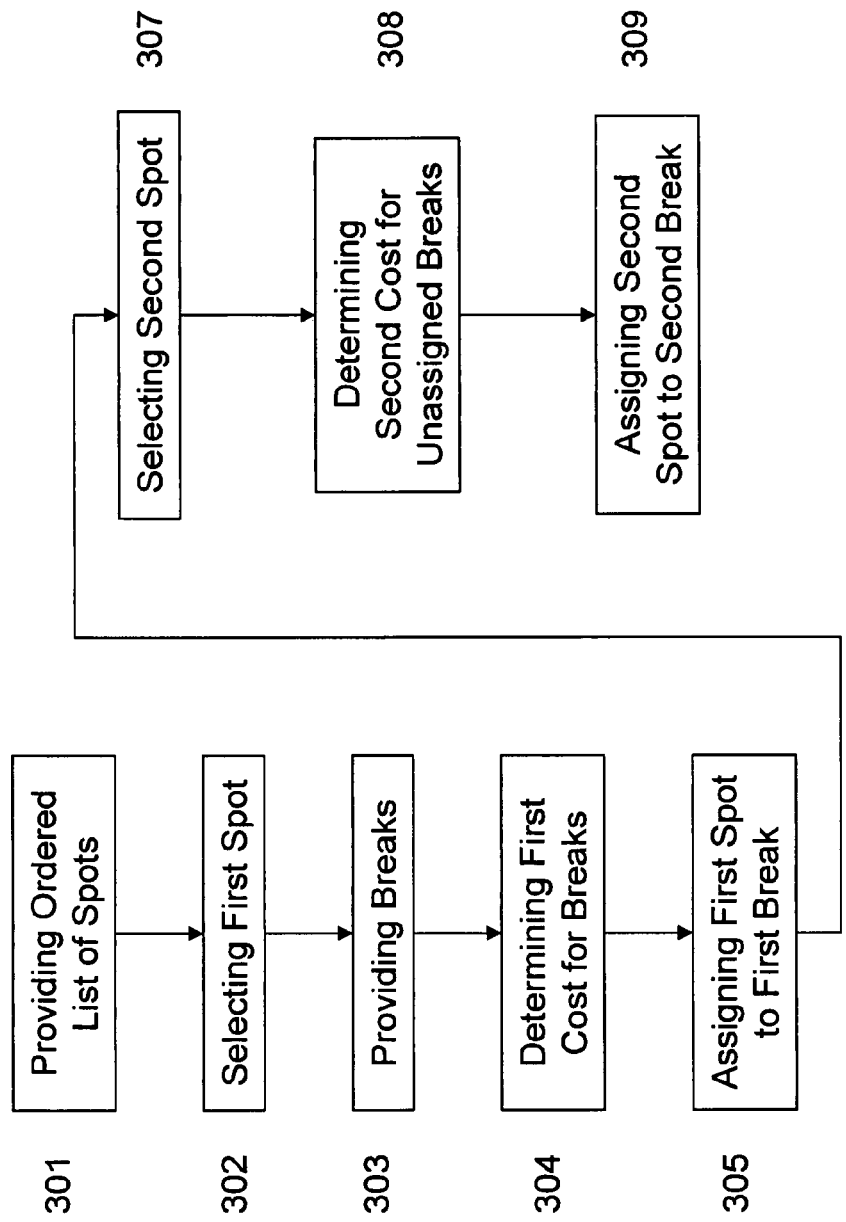
FIG. 3c is a flow diagram of a scheduling method according to an embodiment of the disclosure.

Referring now to FIG. 3b, blocks 301 through 305 are as described above for FIG. 3a. At block 306, the first block may be removed from the ordered list. In FIG. 3c, blocks 301 through 305 are as described above. At block 307, a second spot may be selected from the ordered list. At block 308, a second cost for each of the breaks, or for only the unassigned breaks, may be determined. At block 309 the second spot may be assigned to one (or more) of the breaks, i.e., the "second break". The assignment of the second spot to the second break may be made with respect to fixed and/or relative parameters as discussed herein.

Figure 3D:
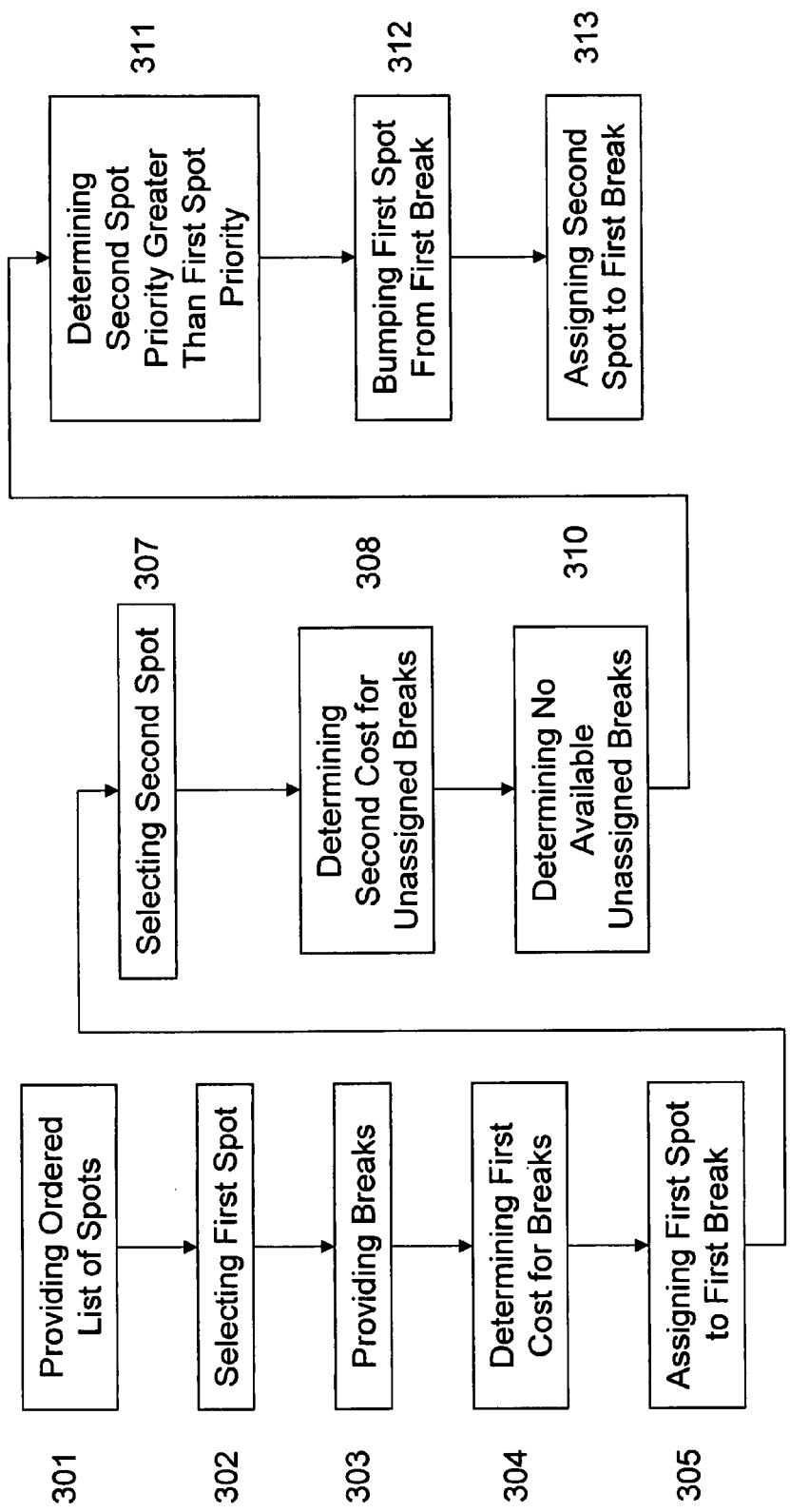
FIG. 3d is a flow diagram of a scheduling method according to an embodiment of the disclosure.

With reference now to FIG. 3d, blocks 301 through 305, 307, and 308 are as described above. At block 310 a determination may be made as to whether any available unassigned breaks exist that meet the criteria for placing the second spot. It may be determined that no unassigned breaks are available for placing the second spot, i.e., none of the unassigned breaks meet the criteria for placing the second spot. At block 311, a determination may be made that the ranking of the second spot is greater than the ranking of the first spot. At block 312, the first spot may be bumped from the first break if, for example, the ranking of the second spot is greater than the ranking of the first spot and perhaps, for example, that the first break meets the criteria for placing the second spot. At block 313, the second spot may be assigned to the first break.

Figure 3E:
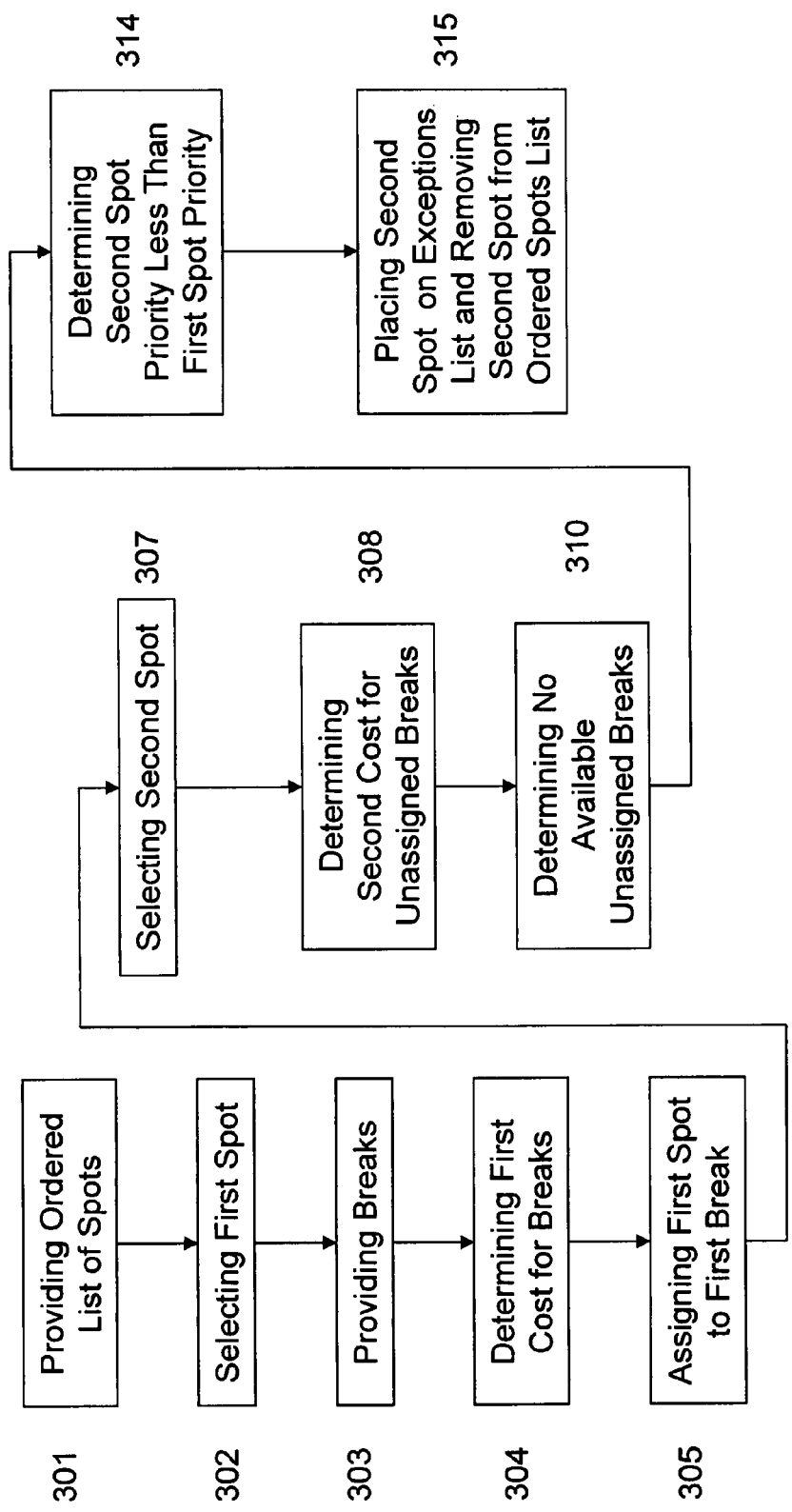
FIG. 3e is a flow diagram of a scheduling method according to an embodiment of the disclosure.
Figure 3F:
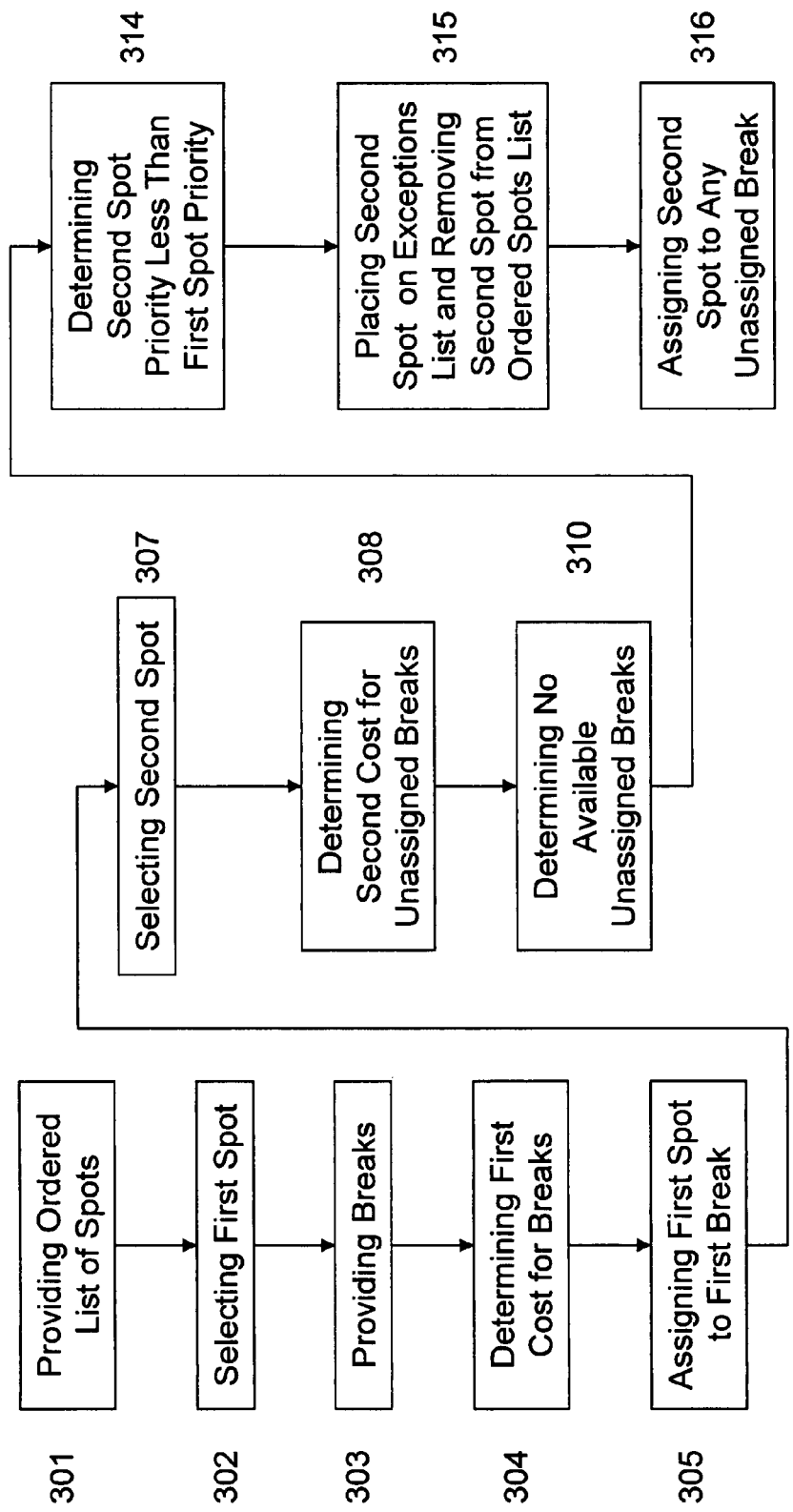
FIG. 3f is a flow diagram of a scheduling method according to an embodiment of the disclosure.

Relating to FIG. 3e, blocks 301 through 305, 307, 308, and 310 are as described above. At block 314 a determination may be made that the ranking of the second spot is less than the ranking of the first spot. At block 315, if, for example, the ranking of the second spot is less than the ranking of the first spot, the second spot may be placed on an exceptions list (perhaps for later scheduling) and removed from the ordered list. Referring now to FIG. 3f, blocks 301 through 305, 307, 308, 310, 314, and 315 are as described above. At block 316, the second spot may be assigned to any unassigned break. This assigning of the second spot may occur after all the spots of a particular contract line have been placed.

Figure 4A:
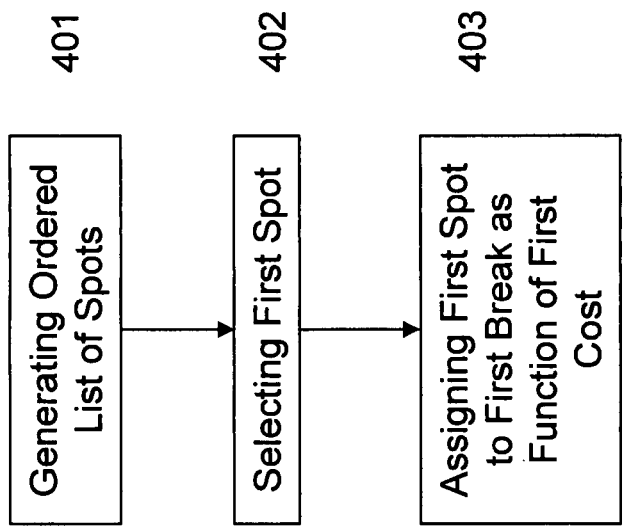
FIG. 4a is a flow diagram of a scheduling method according to an embodiment of the disclosure.

With attention now directed to FIGS. 4a through 4f, these figures represent a set of embodiments of the present disclosure, such as may be implemented in hardware, software, computer programs, circuitry, methodologies, etc., where like reference numbers refer to like components/procedural stages. In FIG. 4a, an ordered list of spots may be generated at block 401. The ordered list of spots may be generated using an AS Order by Clause as described elsewhere herein. At block 402 a first spot may be selected from the ordered list. At block 403 the first spot may be assigned to one (or more) breaks, i.e., the "first break" in any number of ways, such as through preselection or through the use of fixed and relative parameters for determining acceptable breaks, or as a function of a first cost, as described elsewhere herein. The assignment of the first spot to the first break may be made with respect to fixed and/or relative parameters as discussed herein.

Figure 4B:
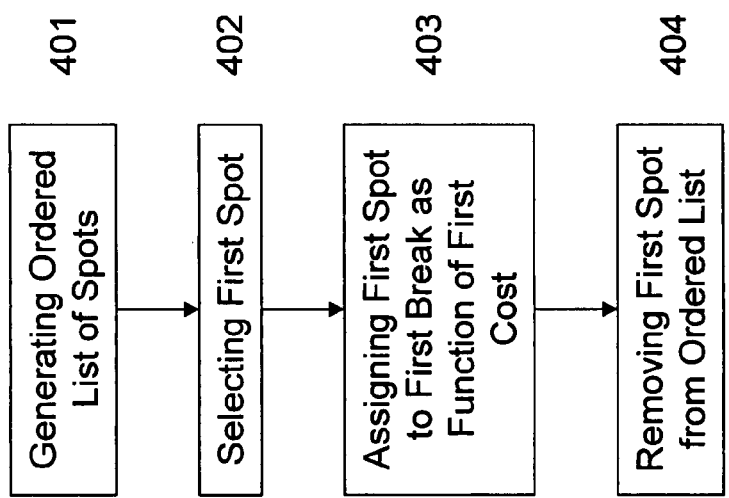
FIG. 4b is a flow diagram of a scheduling method according to an embodiment of the disclosure.
Figure 4C:
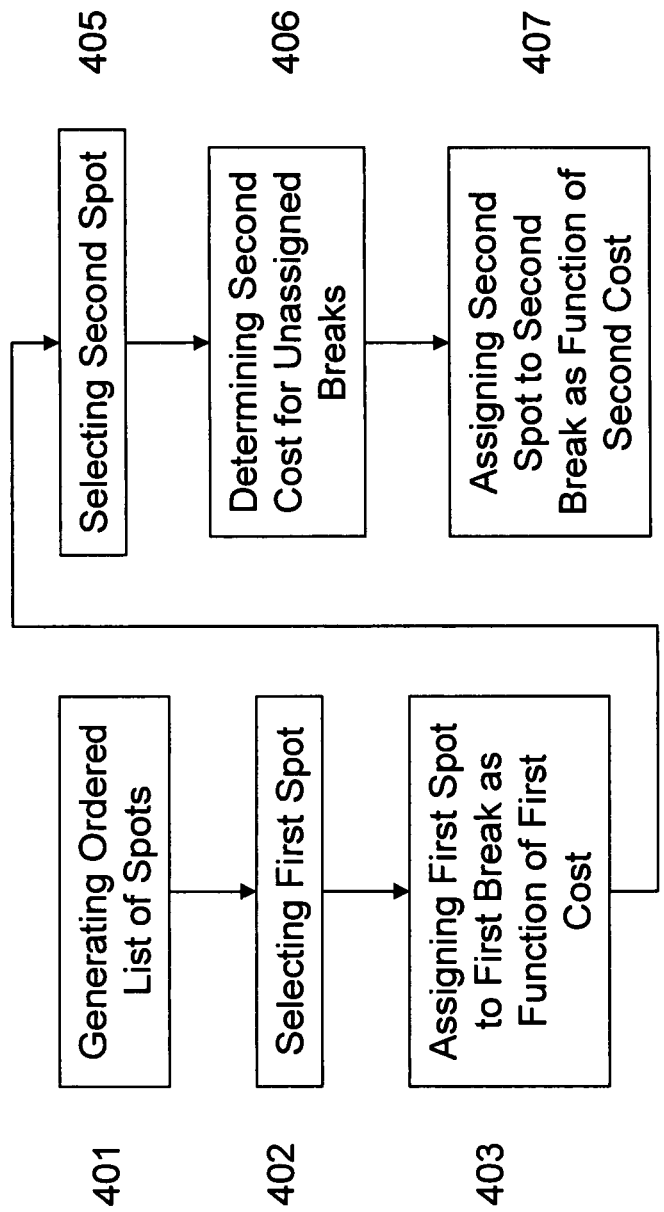
FIG. 4c is a flow diagram of a scheduling method according to an embodiment of the disclosure.

Referring now to FIG. 4b, blocks 401 through 403 are as described above for FIG. 4a. At block 404, the first block may be removed from the ordered list. In FIG. 4c, blocks 401 through 403 are as described above. At block 405, a second spot may be selected from the ordered list. At block 406, a second cost for each of the breaks, or for only the unassigned breaks, may be determined. At block 407 the second spot may be assigned to one (or more) of the breaks, i.e., the "second break". The assignment of the second spot to the second break may be made with respect to fixed and/or relative parameters as discussed herein, or as a function of the second cost.

Figure 4D:
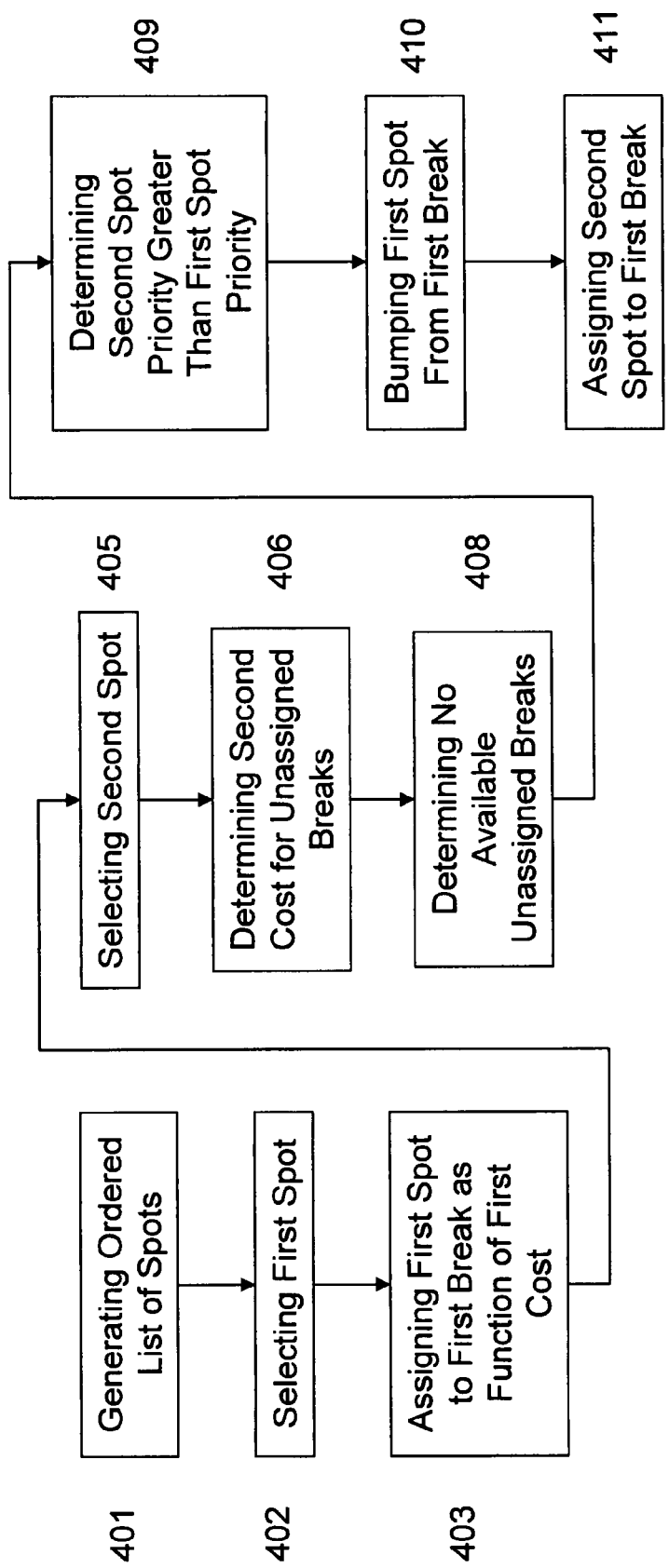
FIG. 4d is a flow diagram of a scheduling method according to an embodiment of the disclosure.

With reference now to FIG. 4d, blocks 401 through 403, 405, and 406 are as described above. At block 408 a determination may be made as to whether any available unassigned breaks exist that meet the criteria for placing the second spot. It may be determined that no unassigned breaks are available for placing the second spot, i.e., none of the unassigned breaks meet the criteria for placing the second spot. At block 409, a determination may be made that the ranking of the second spot is greater than the ranking of the first spot. At block 410, the first spot may be bumped from the first break if, for example, the ranking of the second spot is greater than the ranking of the first spot and perhaps, for example, that the first break meets the criteria for placing the second spot. At block 411, the second spot may be assigned to the first break.

Figure 4E:
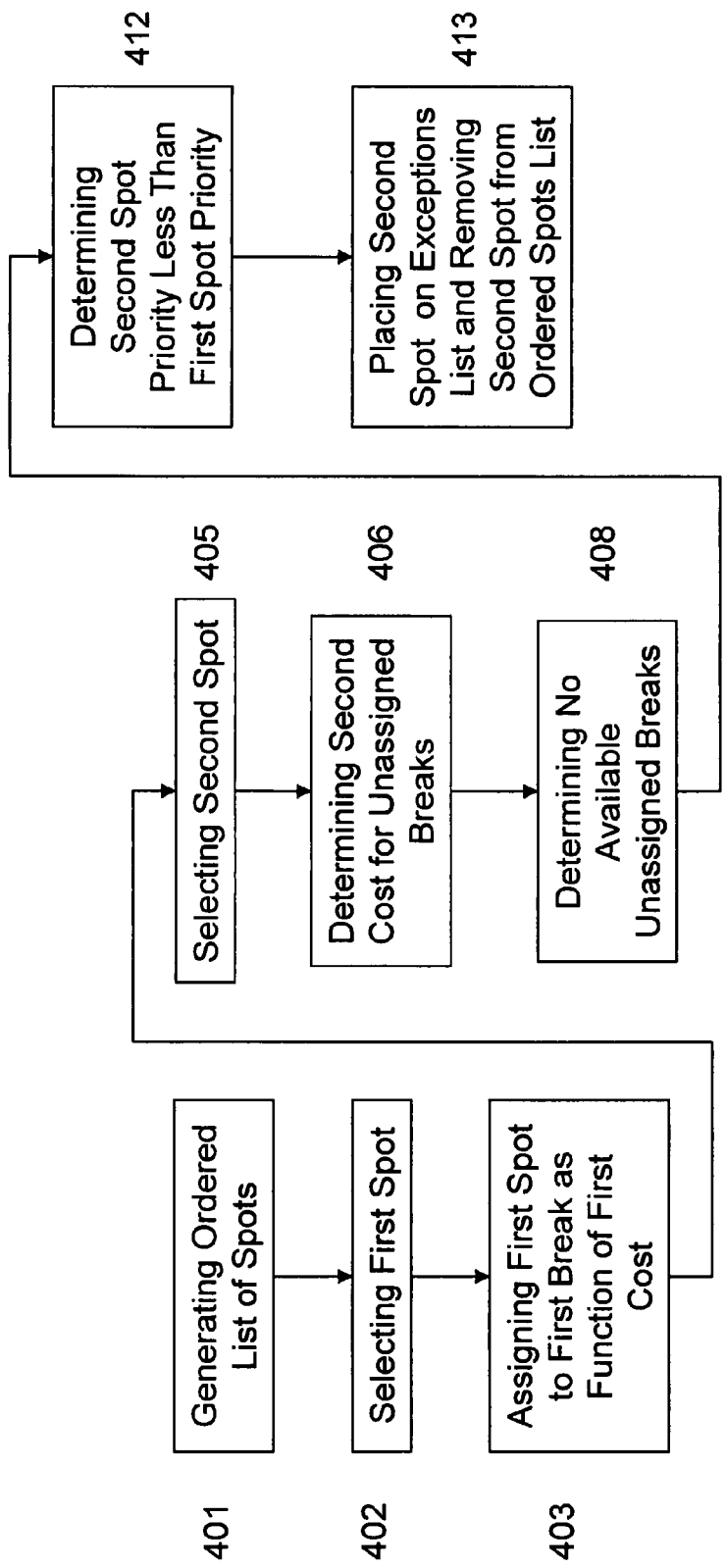
FIG. 4e is a flow diagram of a scheduling method according to an embodiment of the disclosure.
Figure 4F:
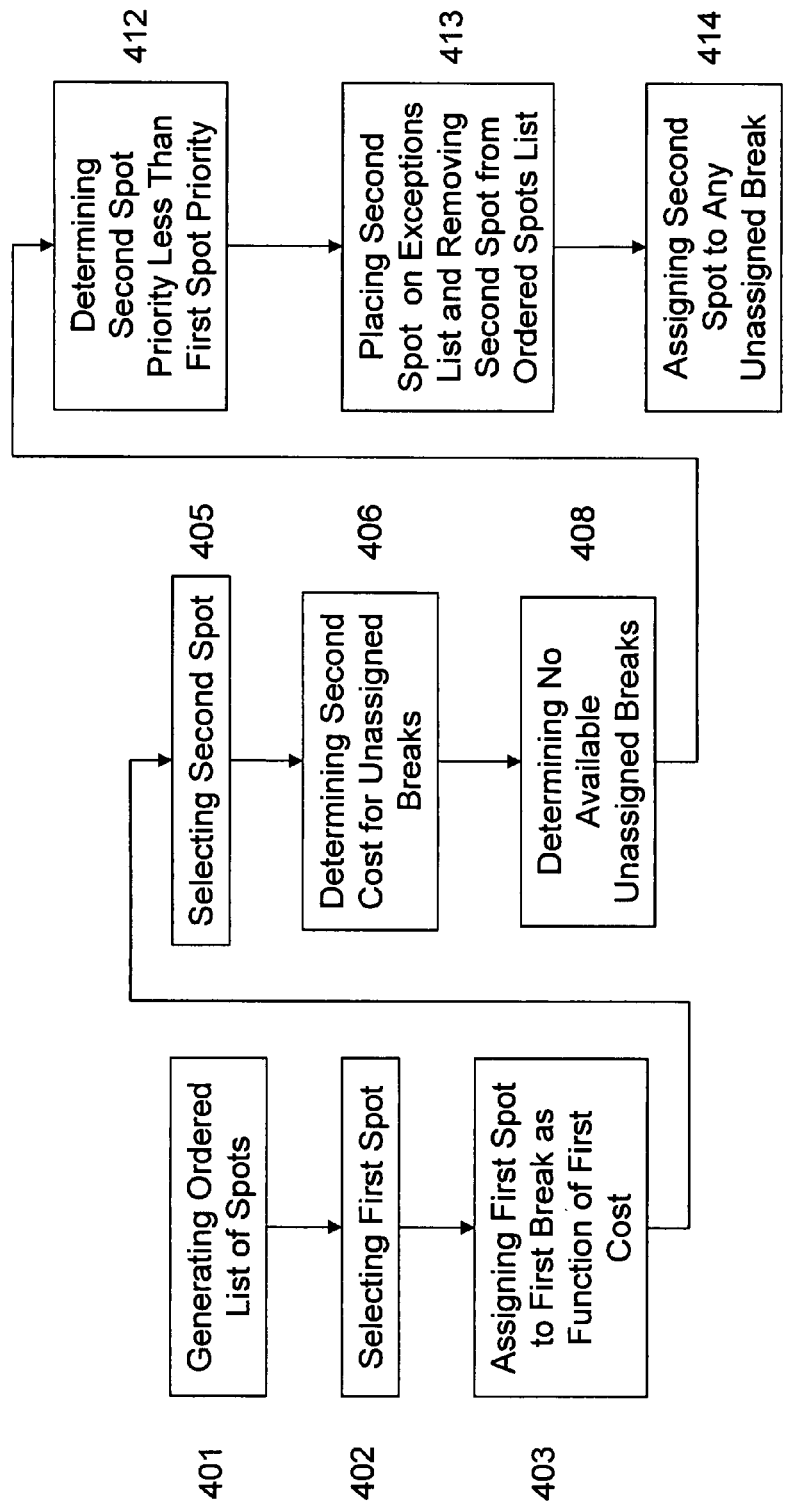
FIG. 4f is a flow diagram of a scheduling method according to an embodiment of the disclosure.

Relating to FIG. 4e, blocks 401 through 403, 405, 406, and 408 are as described above. At block 412 a determination may be made that the ranking of the second spot is less than the ranking of the first spot. At block 413, if, for example, the ranking of the second spot is less than the ranking of the first spot, the second spot may be placed on an exceptions list (perhaps for later scheduling) and removed from the ordered list. Referring now to FIG. 4f, blocks 401 through 403, 405, 406, 408, 412, and 413 are as described above. At block 414, the second spot may be assigned to any unassigned break. This assigning of the second spot may occur after all the spots of a particular contract line have been placed.

With attention now directed towards FIGS. 5a through 5k, an example of scheduling spots in breaks according to an embodiment of the disclosure will be described, where like reference numbers refer to like components/procedural stages. As will be apparent, the example described in FIGS. 5a through 5k is exemplary only and, for simplicity's sake, makes use of only two fixed parameters and two relative parameters. This example is in no way intended to limit the disclosure in any way. Those of skill in the art will readily understand that the example can be expanded to include any number of fixed and/or relative parameters. Additionally, the example described in FIGS. 5a through 5k may be used for any number of spots, contract lines, networks, breaks, time divisions, days, day parts, etc. Additionally, the costs shown are exemplary only and in no way limit the disclosure to the specific costs mentioned.

With the foregoing in mind, FIG. 5a depicts a simplified representation of a break schedule to be filled with spots for a particular network. It shall be understood that this example in no way limits the disclosure to this particular embodiment. The grid shown includes days of the week which are denoted in columns 500 headed by the blocks 500a through 500g labeled "M", "T", "W", "T", "F", "S", and "S" for Monday, Tuesday, Wednesday, Thursday, Friday, Saturday, and Sunday, respectively. Any day can be used as the first column of the grid. Day parts are denoted by rows with reference number 501 and may be broken down into "Overnight", "Morning", "Afternoon", and "Prime", as shown, or by any other denomination such as hours of the day, groups of hours, etc. As shown in FIG. 5a, the day parts may be further subdivided into sub-parts such that the blocks of time begin with the hour:minute designations shown (a 24-hour clock is depicted for ease of use) for blocks 501a through 501h, i.e., 01:15 begins the time block row for reference number 501a, 03:45 begins the time block row for reference number 501b, etc., through 21:15 beginning the time block row for reference number 501h.

Referring now to FIG. 5b, exemplary fixed parameters are applied. For this example, the fixed parameter 502 "Day of the Week" and the fixed parameter 503 "Daypart" are used. As previously discussed, the disclosure is in no way limited to these particular fixed parameters. The "costs" associated with these fixed parameters are also shown in FIG. 5b. The costs are indicative of a desirability for placing a spot in a break within the confines of the particular day and daypart. The Day of the Week costs for each day are shown in blocks 502a through 502g. In this particular example, the costs, which may be user-defined and are in no way limited to the costs shown in this exemplary embodiment, are such that there is a bias towards the earlier days of the week, i.e., the costs associated with Monday, Tuesday, and Wednesday are less than the costs associated with the remaining days of the week. The Daypart costs for each daypart are shown in blocks 503a through 503h. In this particular example, the costs, which may be user-defined and are in no way limited to the costs shown in this exemplary embodiment, are such that there is a bias towards the "Prime" daypart, i.e., the costs associated with the two sub-parts in the "Prime" daypart (rows 503g and 503h) are less than the costs associated with the other dayparts/sub-parts (rows 503a through 503f). Totaling the fixed parameter costs for each row/column results in the numbers shown for each day and daypart in the grid. Methods other than simple totaling of the fixed parameters are contemplated by the present disclosure.

With attention now drawn to FIG. 5c, the blocks 504 indicate the most desirable breaks in the grid based on the two fixed costs discussed with respect to FIG. 5b. These six blocks each have a cost of "0" and since this is the lowest cost on the grid, these blocks represent the breaks with the highest desirability for the fixed factors used in this example. Similarly, the blocks 505 indicate the least desirable breaks in the grid since each of these blocks has a cost of "30" which is the highest cost on the grid. Preferentially, a spot to be placed will be placed in one of the blocks 504 since those are the least cost (i.e., highest desirability) breaks.

Now referring to FIG. 5d, a first spot is placed in block 508, which was one of the blocks 504 in FIG. 5c. Additionally, two relative parameters are now added to the grid: "Same Day" in block 506 and "Same Daypart" in block 507. The "Same Day" relative cost is applied to those days in which a spot has been placed, thereby making it less desirable to place a second spot on the same day. The "Same Daypart" relative cost is applied to those dayparts and/or sub-parts in which a spot has been placed thereby making it less desirable to place a second spot on the same day. Additionally, the fixed and relative parameter costs are not limited to nonnegative numbers so that if a negative number is used, the desirability of a particular day and/or daypart for this example is increased (since the cost would decrease when a negative number is added to the existing cost for a break). The costs associated with the "Same Day" relative parameter are shown in blocks 506a through 506g. For this example, each of the "Same Day" costs are set to "100". As is obvious to those of skill in the art, the "Same Day" costs do not necessarily all have to be the same value. Similarly, the costs associated with the "Same Daypart" relative parameter are shown in blocks 507a through 507h. For this example, each of the "Same Daypart" costs are set to "50". As is obvious to those of skill in the art, the "Same Daypart" costs do not necessarily all have to be the same value.

With continuing reference to FIG. 5d, once the first spot ("Spot 1") has been placed in the break represented by block 508, the costs for the remaining breaks may be recalculated, this time including the appropriate costs associated with the relative parameters "Same Day" and "Same Daypart" with the costs associated with the fixed parameters previously calculated. Alternatively, the costs may be recalculated without reference to the fixed parameter costs. In this particular example, the costs associated with the block of time represented by block 508 is not calculated since for this example the assumption of one spot per block, or break, is made for the sake of simplicity without intending to limit the disclosure to placing one spot in each day/daypart block. As shown, the costs for blocks 509 have been recalculated by taking into account the additional costs due to the relative parameter "Same Daypart" since Spot 1 has been placed in the same daypart as the blocks 509. The same recalculation is done for the blocks 511. Likewise, the costs for blocks 510 have been recalculated by taking into account the additional costs due to the relative parameter "Same Day" since Spot 1 has been placed in the same day (Tuesday) as the blocks 510. The block 512 is located in both the same day and same daypart as Spot 1, therefore the recalculation of the cost for block 512 includes the costs for the relative parameters "Same Day" and "Same Daypart". The costs for the other blocks remain unchanged since none of the other blocks are affected by the costs for the relative parameters, i.e., none of the other blocks are in the same day and/or same daypart as Spot 1. The result is a grid with updated costs, where appropriate.

Referring now to FIG. 5e, it can be seen that, similar to the analysis done with respect to FIG. 5c, the blocks 513 now represent the most desirable breaks since the cost "10" associated with blocks 513 is the lowest on the grid. In the same way, the block 514 represents the least desirable break since the cost "150" associated with this break is the highest on the grid. Therefore, a second spot would preferentially be placed in one of the 513 (lowest cost/highest desirability) blocks. Looking now at FIG. 5f, a second spot ("Spot 2") is placed in block 515, which was one of the blocks 513 in FIG. 5e. Consistent with the discussion above for FIG. 5d, the costs for the unassigned blocks/breaks are again recalculated for the relative parameters (which are assumed, for simplicity's sake, to be unchanged throughout this example). The changes in the costs for each of the unassigned blocks can be discerned by comparing the cost associated with a particular block in FIG. 5e (the cost after placing Spot 1) with the cost for the corresponding block in FIG. 5f (the cost after placing Spot 2).

With attention now drawn to FIG. 5g, the blocks 516 represent the most desirable breaks since the cost "15" associated with these blocks is the lowest on the grid. In the same way, the blocks 517 represent the least desirable breaks since the cost "160" associated with these blocks is the highest on the grid. Now looking at FIG. 5h, a third spot ("Spot 3") is placed in block 518, which was one of the blocks 516 in FIG. 5g. As before, the costs associated with the unassigned blocks are recalculated after the placement of Spot 3 and are shown in FIG. 5h.

Now referring to FIG. 5i, the blocks 519 represent the most desirable breaks since the cost "25" associated with these blocks is the lowest on the grid. In the same way, the blocks 520 represent the least desirable breaks since the cost "165" associated with these blocks is the highest on the grid. Now looking at FIG. 5j, a fourth spot ("Spot 4") is placed in block 521, which was one of the blocks 519 in FIG. 5i. As above, the costs associated with the unassigned blocks are recalculated after the placement of Spot 4 and are shown in FIG. 5j. Finally, FIG. 5k reveals that the blocks 522 represent the most desirable breaks since the cost "60" associated with these blocks is the lowest on the grid. In the same way, the block 523 represents the least desirable break since the cost "175" associate with this block is the highest on the grid. Therefore, the placement of a fifth spot (not shown) would preferentially be in one of the blocks 522. As is obvious to those of skill in the art, the procedure can be repeated until either all of the spots are placed and/or all of the breaks are occupied. It should also be obvious to those of skill in the art that the foregoing example can be expanded to include any number of fixed parameters, relative parameters, any value of costs, and day and/or time divisions as desired.

Fixed parameters typically do not change when a spot is placed. Fixed parameters may include, but are not limited to, the following: "day of the week" which allows a particular cost to be assigned to a particular day, "daypart" which allows a particular cost to be assigned to a particular daypart, "used break" or "availability" (whether a spot is placed in a break regardless if the spot is from the same or different client, contract, or contract line, for example) which can be used to assign costs so that breaks are more evenly filled, and "empty break" which can be used to assign a cost to empty breaks in order to favor breaks that already have a spot assigned to it.

Relative parameters typically change as spots are placed. Relative parameters may include, but are not limited to, the following: "narrow window" which may assign a cost to a spot placed in a same time-frame window as a previously-placed spot, such as a 15-minute window, for example, "wide window" which may assign a cost to a spot placed in a same time-frame window as a previously-placed spot, such as a 60-minute window, for example, "daypart" or "same daypart" which allows for a cost to be assigned to the breaks in a daypart for which a previous spot has been placed, "same day" which allows for a cost to be assigned to the breaks in a day for which a previous spot has been placed, "same day+n" which is similar to "same day" where the "same day" cost is expanded to n days either side of a placed spot, and "preferred product separation" which assigns costs to those breaks close to a previously-assigned break for a spot for a particular product or company so as to maintain a separation in time from the previously-assigned break.

Figure 6:
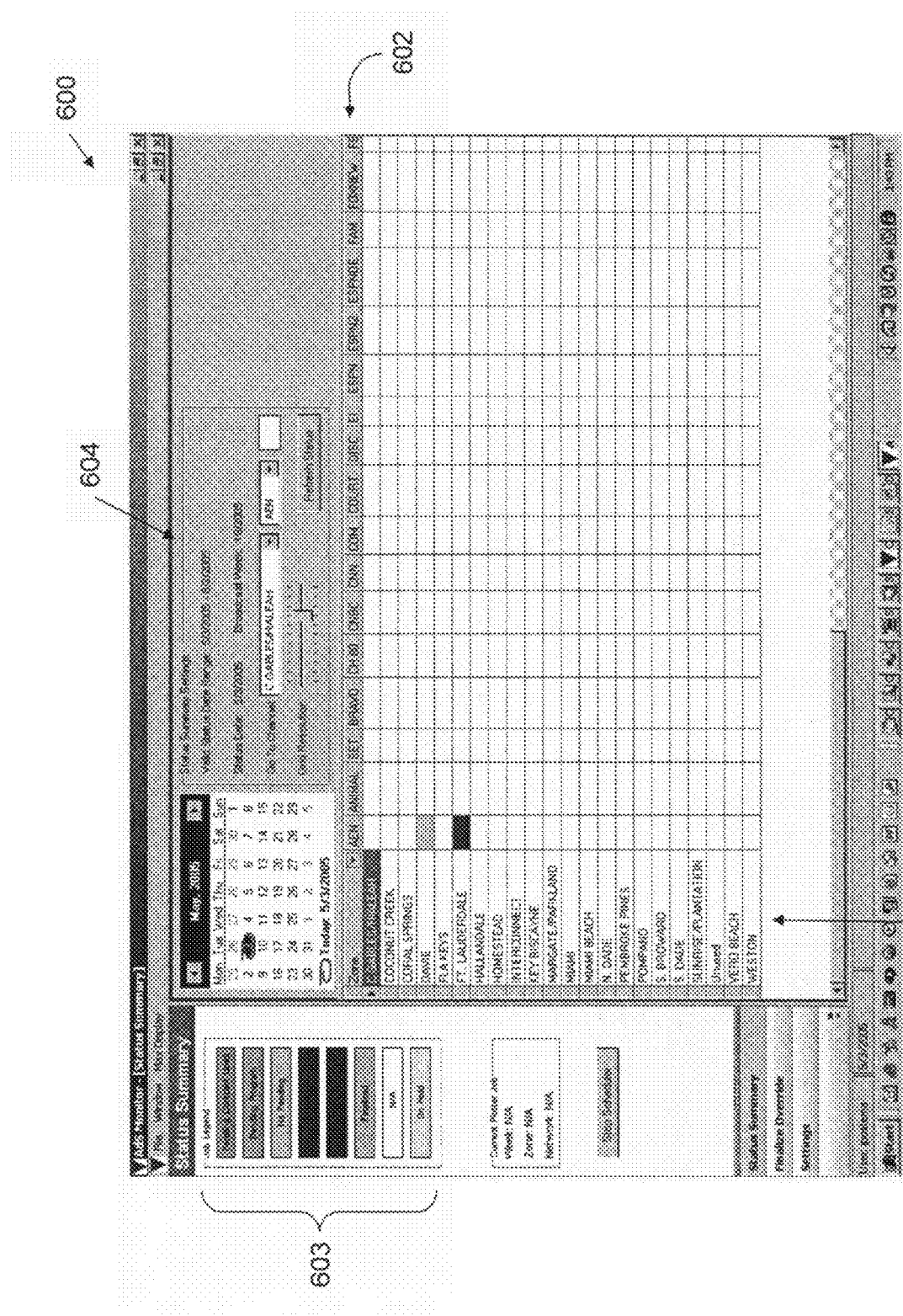
FIG. 6 is illustrative of an exemplary graphical user interface according to an embodiment of the disclosure.

Referring now to FIG. 6, reference number 600 refers to an exemplary graphical user interface, according to an embodiment of the disclosure, showing an example of a status summary display according to an embodiment of the disclosure. Broadcast zones 601 and networks 602 form a grid for which jobs 603 can be entered to give an operator a quick-look overview of the status of placing spots. Status summary settings 604 may be used by the operator to change the parameters of the display grid.

Figure 7:
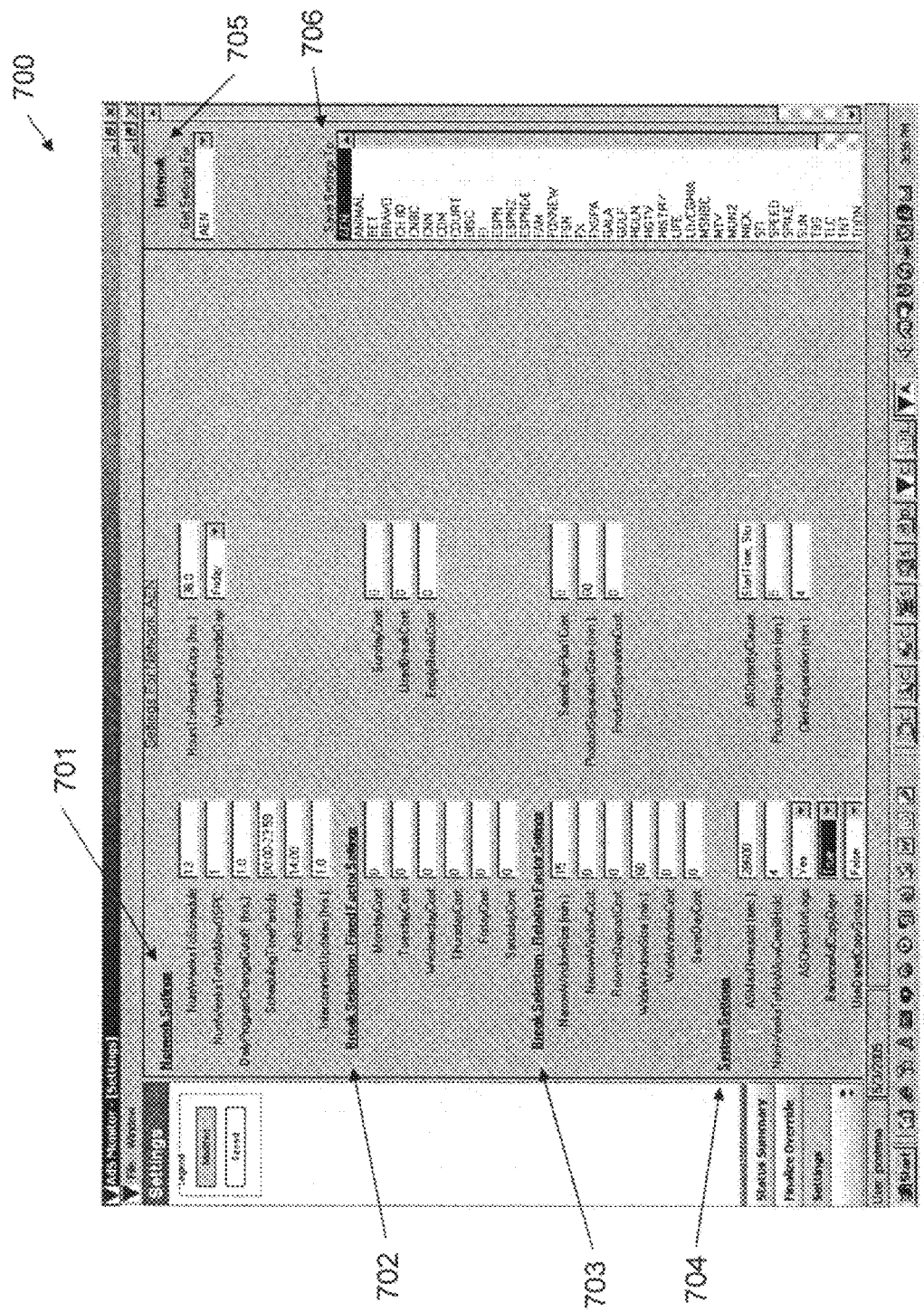
FIG. 7 is illustrative of an exemplary graphical user interface according to an embodiment of the disclosure.

With attention now drawn to FIG. 7, the exemplary graphical user interface 700 represents an input screen according to an embodiment of the disclosure. The various inputs on screen 700 may be user-configurable and the values entered may be set by the user. The input screen may include network settings 701 for setting parameters for scheduling on a particular network, as indicated at 705, and may include, but is not necessarily limited to, "NumWeeksToSchedule" for setting the number of weeks to schedule spots on the particular network, "NumWeeksToNotAllowOSPC" for setting the number of weeks in "NumWeeksToSchedule" to allow oversold and product conflicts ("OSPC") in the schedule, "DailyProgramChangeCutoff" for setting the number of hours prior to scheduling for the system to stop importing network programming updates, "SchedulingTimePeriods" for setting time periods when the adaptive scheduler can run, e.g., it may be desirable to not allow the scheduler to run during a particular time when it is anticipated that changes will be made to some of the parameters, "FixSchedule" for setting the time when the scheduling will be completed, "HoursToRequireCopy" for setting the number of hours the system should require advertising copy for scheduling spots, "WeekendOverrideDay" for setting the day of the week to stop program changes, contract changes, and/or require copy for the weekend and/or the following Monday, for example, and "RescheduleCutoff" (not shown) for designating a time after which spots that need to be rescheduled for the current day, for example, will be allowed to be rescheduled.

With continuing attention to FIG. 7, the input screen of the exemplary graphical user interface 700 may also include break selection 702 for setting fixed factors (fixed parameters). The fixed factors may include, but are not limited to, "MondayCost" for setting the cost associated with a break occurring on a Monday, "TuesdayCost" for setting the cost associated with a break occurring on a Tuesday, "WednesdayCost" for setting the cost associated with a break occurring on a Wednesday, "ThursdayCost" for setting the cost associated with a break occurring on a Thursday, "FridayCost" for setting the cost associated with a break occurring on a Friday, "SaturdayCost" for setting the cost associated with a break occurring on a Saturday, "SundayCost" for setting the cost associated with a break occurring on a Sunday, "UsedBreakCost" for setting costs to favor scheduling spots evenly, "EmptyBreakCost" for setting costs to favor scheduling spots in breaks that already have a spot scheduled. and "DayPartCost" (not shown) for assigning costs to particular dayparts, as discussed previously.

Still with continuing attention to FIG. 7, the input screen of the exemplary graphical user interface 700 may also include break selection 703 for setting relative factors (relative parameters). The relative factors may include, but are not limited to, "NarrowWindowSize" for setting an amount of time that two spots, typically, but not necessarily, for the same client and/or same contract, are placed within each other for the day being scheduled based on historical spot placement, "NarrowWindowCost" for setting a cost to a break in the NarrowWindowSize, i.e., a same time-frame window as a previously-placed spot, such as a 15-minute window, for example, typically, but not necessarily, for the same client and/or same contract, "RelativeDaypartCost" for setting a cost to be assigned to the breaks in a daypart for which a previous spot, typically from the same client, has been placed, "WideWindowSize" for setting an amount of time that two spots, typically, but not necessarily, for the same client and/or same contract, are placed within each other for the day being scheduled based on historical spot placement, "WideWindowCost" for setting a cost to a break in the WideWindowSize, i.e., a same time-frame window as a previously-placed spot, such as a 60-minute window, for example, typically, but not necessarily, for the same client and/or same contract, "SameDayCost" for setting a cost to a break occurring in the same day as another spot previously placed, where the previously-placed spot typically, but not necessarily is for the same client and/or same contract, "SameDayPlus1Cost" for setting a cost to breaks occurring in the day immediately preceding or immediately following the day a previously-placed spot occurs, where the previously-placed spot typically, but not necessarily is for the same client and/or same contract, "ProductSeparationSize (min)" for setting an amount of time that two spots for the same product, for example, may be placed within each other for the day being scheduled based on historic spot placement, and "ProductSeparationCost" for setting a cost for breaks within the "ProductSeparationSize (min)" time frame.

With further attention to FIG. 7, the input screen of the exemplary graphical user interface 700 may also include system settings 704 for setting systems parameters. The system parameters may include, but are not limited to, "ASMaxOversold (sec)" which designates the maximum number of seconds, for example, that can be shown as over sold or have a product conflict in a time frame (e.g., a week) that allow over selling and/or product conflicts, " "NumWeeksToNotAllowCreditHold" which designates a number of weeks within NumWeeksToSchedule (in the network settings 701 described above) to allow spots to be scheduled from contracts that are in a status of credit hold, "ASCheckforLogs" to disallow spots from being scheduled when a playlist has been previously generated, "BalanceAdCopyDays" may be a true/false entry choice for preventing front-loading of spots during scheduling due to expiring ad copy, "UseDatedCopyGroups" which enables a feature that allows a user to provide copy start and stop dates within a rotation pattern that may be different than the ad copy library dates, "BreakSelectionNumofWeeks" (not shown) which designates the number of weeks worth of historical spot placement data to consider when calculating break scheduling values, "ASOrderByClause" which, as discussed above, may be used in the determination of the order in which spots are placed by, for example, ordering the various contract lines and/or ordering the various spots to be placed within one or more contract lines, "ProductSeparation (min)" which designates the number of minutes that need to occur between spots that are associated with the same or similar product type, "ClientSeparation (min)" which designates the number of minutes that need to occur between spots that are associated with the same client, "AdsPlotterWaitInterval (sec)" (not shown) which designates how often the scheduler will attempt to look for contract lines that need to be scheduled, "AdsPlotterSPTimeOut (sec)" (not shown) which designates how long a database process will run before stopping and producing and error, and "AdsPlotterSchedulingBreaksReq" (not shown) which designates the number of breaks that must be in the system for a given week, for example, before scheduling will occur.

Figure 8:
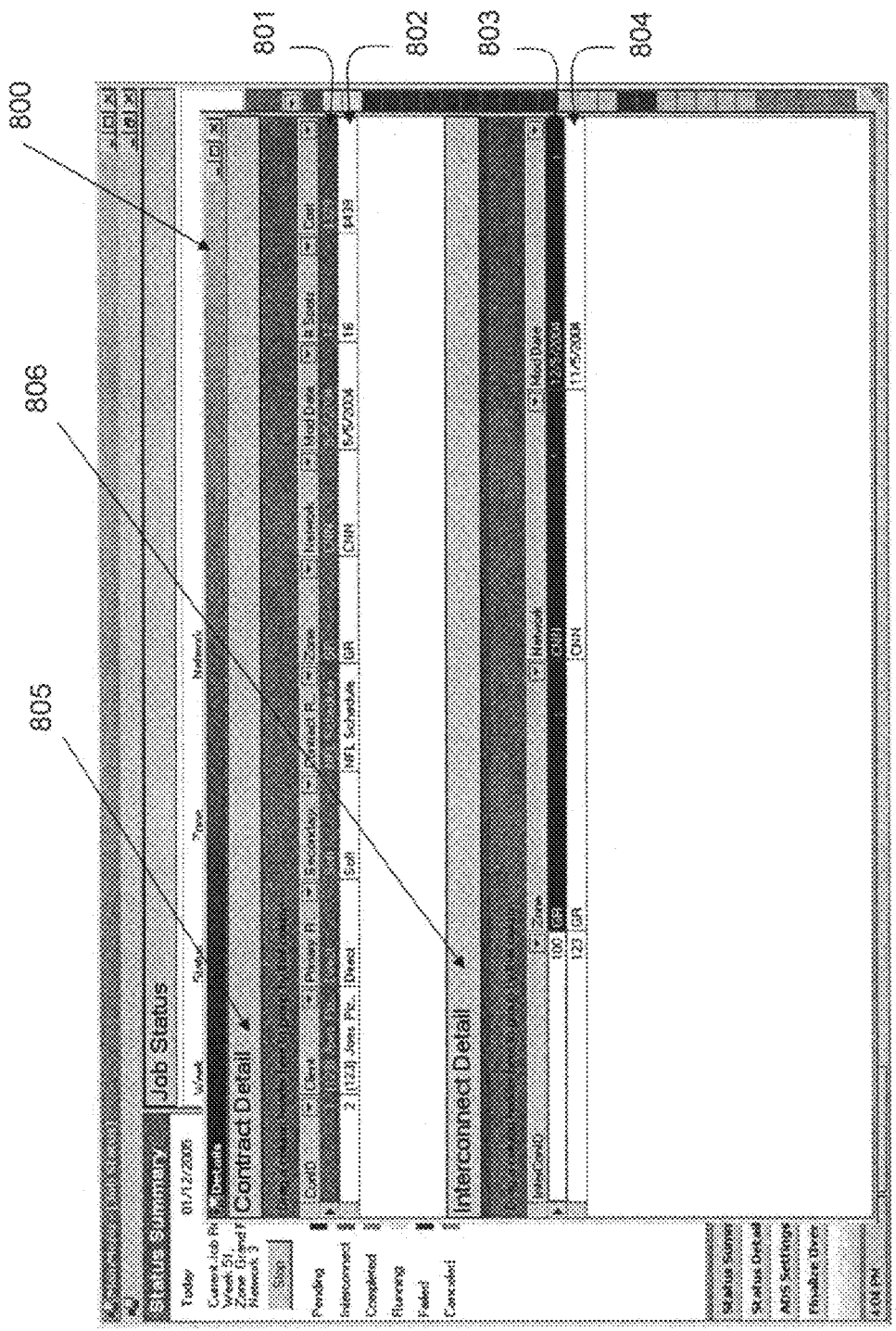
FIG. 8 is illustrative of an exemplary graphical user interface according to an embodiment of the disclosure.

Considering now FIG. 8, a detail screen 800 is illustrative of an exemplary graphical user interface, according to an embodiment of the disclosure. The screen 800 may include a Contract Detail section 805 which may include, but is not necessarily limited to, columns for "ConID" (contract identification), "Client", "Primary Reference", "Secondary Reference", "Contract Remarks", "Zone", "Network", "Mod Date" (modification date), "# Spots" (number of spots to be scheduled), and "Cost". A first contract line 801 is shown with information for the above-mentioned columns and a second contract line 802 is shown with similar information. The screen 800 may also include an Interconnect Detail section 806 which may include, but is not necessarily limited to, columns for "InterConID" (interconnect identification), "Zone", "Network", and "Mod Date" (modification date). A first interconnect line 803 is shown with information for the above-mentioned columns and a second interconnect line 804 is shown with similar information.

Figure 9:
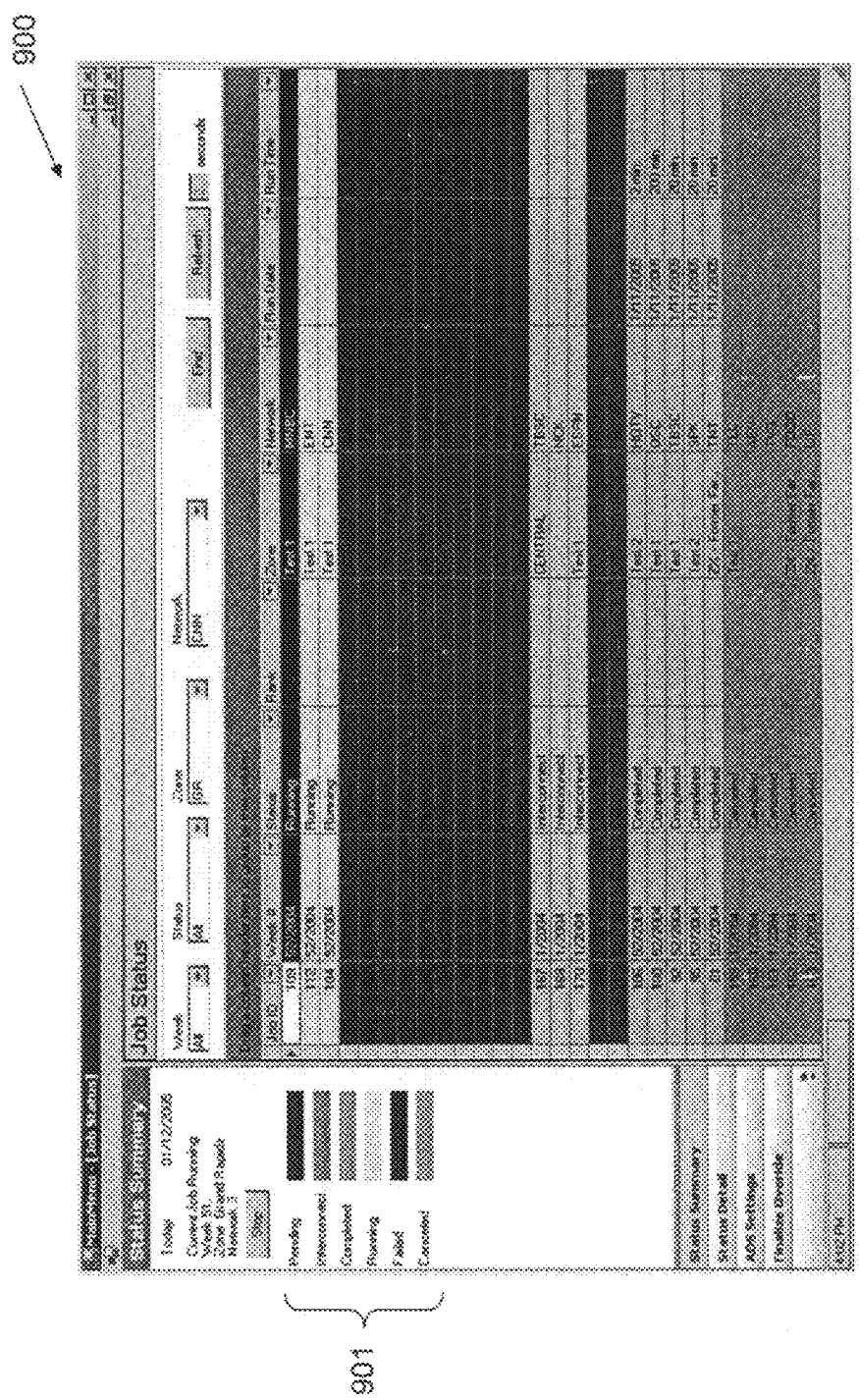
FIG. 9 is illustrative of an exemplary graphical user interface according to an embodiment of the disclosure.

Referring now to FIG. 9. a job status screen 900 is shown which is illustrative of an exemplary graphical user interface according to an embodiment of the disclosure. The job status screen 900 may include, but is not necessarily limited to, columns for "JobID" (job identification", "Week #" (week number), "Status", "Rank", "Zone", "Network", "Run Date", and "Run Time". The grid on screen 900 can be coded by the job status indicators 901 to give the users a quick overview of the status of the jobs in the scheduler.

Figure 10:
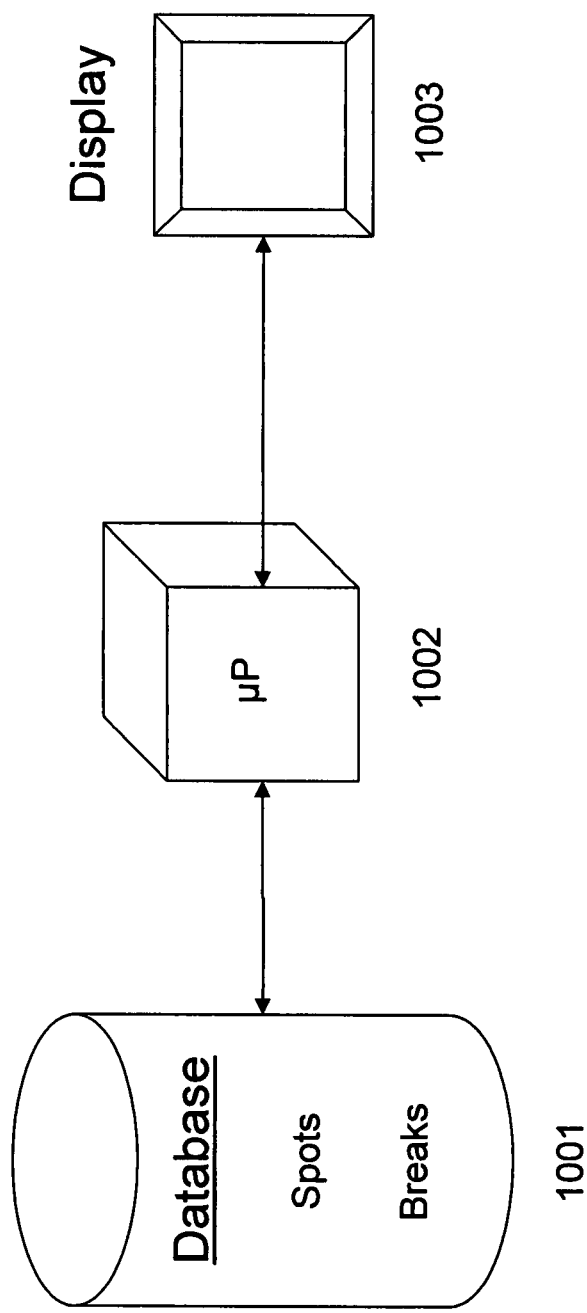
FIG. 10 is a block diagram of a scheduling system according to an embodiment of the disclosure.

With attention now directed towards FIG. 10, scheduling system according to an embodiment of the disclosure is shown in block diagram form. A database 1001 may include an ordered list of spots to be scheduled, where each spot may have an associated scheduling factor, and a plurality of breaks for one or more networks. A microprocessor 1002 may be operatively connected to the database 1001 and a display device 1003. The microprocessor may include circuitry for selecting one of the spots from the database 1001, circuitry for determining a first cost for each of the breaks in the database 1001 as a function of a predetermined algorithm, and circuitry for assigning the first spot to one (or more) of the breaks which has a lowest first cost or that has a first cost that is less than a first predetermined amount. The predetermined algorithm may determine the first cost as a function of a predetermined fixed parameter, as described herein. The microprocessor 1002 may also include circuitry for removing the first spot from the ordered list in the database 1001. Furthermore, the microprocessor 1002 may include circuitry for selecting a second spot from the database 1001, which may be the same as the circuitry for selecting the first spot, circuitry for determining a second cost for unassigned breaks in the database 1001 as a function of the first cost and as a function of a predetermined relative parameter, as described herein, and circuitry for assigning the second spot to one of the unassigned breaks in database 1001 which has a lowest second cost or has a second cost that is less than a second predetermined amount, which may be the same as the circuitry for assigning the first spot. Additionally, the circuitry for assigning the second spot may determine that no unassigned breaks in the database 1001 have a second cost less than a second predetermined amount thereby preventing the second spot from being assigned to one of the unassigned breaks in database 1001, and the circuitry may determine that the second spot has a ranking greater than a ranking for the first spot, bump the first spot from the first break, and assign the second spot to the first break.

Still further, the circuitry for assigning the second spot may determine that no unassigned breaks have a second cost less than a second predetermined amount thereby preventing the second spot from being assigned to one of the unassigned breaks in the database 1001, and may determine that the second spot has a ranking less than a ranking for the first spot, place the second spot on an exceptions list, and remove the second spot from the ordered list of spots.

Yet further, the circuitry for assigning the second spot may assign the second spot to any one of the unassigned breaks in the database 1001. Additionally, the microprocessor 1002 may include circuitry for assigning ad copy to each of the first and second spots.

The display device 1003 may be an electronic display device, such as an LCD (liquid crystal display) screen, a CRT (cathode ray tube), or other similar display device, as is known in the art. The display device may also be a printer for printing out, rather than displaying, the results of the operation of the scheduling system. The display device 1003 may display/print out any or all of the screens shown in FIGS. 6 through 9.

The above description is not intended and should not be construed to be limited to the examples given but should be granted the full breadth of protection afforded by the appended claims and equivalents thereto. Although the disclosure is described using illustrative embodiments provided herein, it should be understood that the principles of the disclosure are not limited thereto and may include modification thereto and permutations thereof.

We claim:

1. A method of scheduling, comprising:
   (a) providing an ordered list of advertising spots ("spots") to be scheduled wherein each spot has an associated scheduling factor;
   (b) selecting a first one of said spots;
   (c) providing plural commercial break locations ("breaks") for one or more networks;
   (d) determining a first cost for each of said breaks as a function of a predetermined algorithm by a microprocessor based system wherein said algorithm determines said first cost as a function of a predetermined fixed parameter, and wherein said fixed parameter is user defined; and
   (e) assigning said first spot to one of said breaks ("first break") which has a lowest first cost
   (f) selecting a second one of said spots;
   (g) determining a second cost for each unassigned break as a function of said first cost and as a function of a predetermined relative parameter; and
   (h) assigning said second spot to one of said unassigned breaks ("second break") which has a lowest second cost.

2. The method of claim 1 wherein the lowest second cost is a second cost less than a second predetermined amount.

3. The method of claim 1 wherein said relative parameter is selected from the group consisting of: interval of time between said first break and said second break, difference in day part of said first break and day part of said second break, difference between day of the week of said first break and day of the week of said second break, difference between a first product associated with said first spot and a second product associated with said second spot, and combinations thereof.

4. The method of claim 1 further comprising:
   (i) assigning ad copy to each of said first and second spots.

5. The method of claim 1 wherein said first spot is associated with a first client and said second spot is associated with a second client.

6. The method of claim 1 wherein said first and second spots are the same.

7. The method of claim 1 wherein said first and second spot are associated with a same contract line.

8. The method of claim 1 wherein said fixed parameter and said relative parameter are each user defined.

9. A method of scheduling, comprising:
   (a) providing an ordered list of advertising spots ("spots") to be scheduled wherein each spot has an associated scheduling factor;
   (b) selecting a first one of said spots;
   (c) providing plural commercial break locations ("breaks") for one or more networks;
   (d) determining a first cost for each of said breaks as a function of a predetermined algorithm by a microprocessor based system wherein said algorithm determines said first cost as a function of a predetermined fixed parameter, and wherein said fixed parameter is user defined; and
   (e) assigning said first spot to one of said breaks ("first break") which has a lowest first cost
   (f) selecting a second one of said spots;
   (g) determining a second cost for each unassigned break as a function of said first cost and as a function of a predetermined relative parameter;
   (h) determining that no unassigned breaks have a second cost less than a second predetermined amount thereby preventing said second spot from being assigned to one of said unassigned breaks;
   (i) determining that said second spot has a ranking greater than a ranking for said first spot;
   (j) bumping said first spot from said first break; and
   (k) assigning said second spot to said first break.

10. A method of scheduling, comprising:
    (a) providing an ordered list of advertising spots ("spots") to be scheduled wherein each spot has an associated scheduling factor;
    (b) selecting a first one of said spots;
    (c) providing plural commercial break locations ("breaks") for one or more networks;

(d) determining a first cost for each of said breaks as a function of a predetermined algorithm by a microprocessor based system wherein said algorithm determines said first cost as a function of a predetermined fixed parameter, and wherein said fixed parameter is user defined; and, (e) assigning said first spot to one of said breaks ("first break") which has a lowest first cost;

(f) selecting a second one of said spots;

(g) determining a second cost for each unassigned break as a function of said first cost and as a function of a predetermined relative parameter;

(h) determining that no unassigned breaks have a second cost less than a second predetermined amount thereby preventing said second spot from being assigned to one of said unassigned breaks;

(i) determining that said second spot has a ranking less than a ranking for said first spot; and (j) placing said second spot on an exceptions list and removing said second spot from said ordered list of spots.

11. The method of claim 10 further comprising:

(k) assigning said second spot to any one of said unassigned breaks.

12. A computer program stored on non-transitory computer-readable media including program instructions for scheduling an advertising spot, the program comprising program instructions for:

(a) providing an ordered list of advertising spots ("spots") to be scheduled wherein each spot has an associated scheduling factor;

(b) selecting a first one of said spots;

(c) providing plural commercial break locations ("breaks") for one or more networks;

(d) determining a first cost for each of said breaks as a function of a predetermined algorithm wherein said algorithm determines said first cost as a function of a predetermined fixed parameter, and wherein said fixed parameter is user defined; and (e) assigning said first spot to one of said breaks ("first break") which has a lowest first cost (f) selecting a second one of said spots;

(g) determining a second cost for each unassigned break as a function of said first cost and as a function of a predetermined relative parameter; and (h) assigning said second spot to one of said unassigned breaks ("second break") which has a lowest second cost.

13. The computer program of claim 12 wherein the lowest second cost is a second cost less than a second predetermined amount.

14. The computer program of claim 12 wherein said relative parameter is selected from the group consisting of: interval of time between said first break and said second break, difference in day part of said first break and day part of said second break, difference between day of the week of said first break and day of the week of said second break, difference between a first product associated with said first spot and a second product associated with said second spot, and combinations thereof.

15. The computer program of claim 12 further comprising program instructions for:

(i) assigning ad copy to each of said first and second spots.

16. The computer program of claim 12 wherein said first spot is associated with a first client and said second spot is associated with a second client.

17. The computer program of claim 12 wherein said first and second spots are the same.

18. The computer program of claim 12 wherein said first and second spot are associated with a same contract line.

19. The computer program of claim 12 wherein said fixed parameter and said relative parameter are each user defined.

20. A computer program stored on non-transitory computer-readable media including program instructions for scheduling an advertising spot, the program comprising program instructions for:

(a) providing an ordered list of advertising spots ("spots") to be scheduled wherein each spot has an associated scheduling factor;

(b) selecting a first one of said spots;

(c) providing plural commercial break locations ("breaks") for one or more networks;

(d) determining a first cost for each of said breaks as a function of a predetermined algorithm wherein said algorithm determines said first cost as a function of a predetermined fixed parameter, and wherein said fixed parameter is user defined; and (e) assigning said first spot to one of said breaks ("first break") which has a lowest first cost;

(f) selecting a second one of said spots;

(g) determining a second cost for each unassigned break as a function of said first cost and as a function of a predetermined relative parameter;

(h) determining that no unassigned breaks have a second cost less than a second predetermined amount thereby preventing said second spot from being assigned to one of said unassigned breaks;

(i) determining that said second spot has a ranking greater than a ranking for said first spot;

(j) bumping said first spot from said first break; and (k) assigning said second spot to said first break.

21. A computer program stored on non-transitory computer-readable media including program instructions for scheduling an advertising spot, the program comprising program instructions for:

(a) providing an ordered list of advertising spots ("spots") to be scheduled wherein each spot has an associated scheduling factor;

(b) selecting a first one of said spots;

(c) providing plural commercial break locations ("breaks") for one or more networks;

(d) determining a first cost for each of said breaks as a function of a predetermined algorithm wherein said algorithm determines said first cost as a function of a predetermined fixed parameter, and wherein said fixed parameter is user defined; and (e) assigning said first spot to one of said breaks ("first break") which has a lowest first cost;

(f) selecting a second one of said spots;

(g) determining a second cost for each unassigned break as a function of said first cost and as a function of a predetermined relative parameter;

(h) determining that no unassigned breaks have a second cost less than a second predetermined amount thereby preventing said second spot from being assigned to one of said unassigned breaks;

(i) determining that said second spot has a ranking less than a ranking for said first spot; and (j) placing said second spot on an exceptions list and removing said second spot from said ordered list of spots.

22. The computer program of claim 21 further comprising program instructions for:

(k) assigning said second spot to any one of said unassigned breaks.

23. A system for scheduling, comprising:
a database comprising:
an ordered list of advertising spots ("spots") to be scheduled wherein each spot has an associated scheduling factor, and
a plurality of commercial break locations ("breaks") for one or more networks; and
a microprocessor operatively connected to said database, said microprocessor comprising:
circuitry for selecting a first one of said spots;
circuitry for determining a first cost for each of said breaks as a function of a predetermined algorithm wherein said algorithm determines said first cost as a function of a predetermined fixed parameter, and wherein said fixed parameter is user defined; and
circuitry for assigning said first spot to one of said breaks ("first break") which has a lowest first cost;
circuitry for selecting a second one of said spots;
circuitry for determining a second cost for each unassigned break as a function of said first cost and as a function of a predetermined relative parameter; and
circuitry for assigning said second spot to one of said unassigned breaks ("second break") which has a lowest second cost.

24. The system of claim 23 wherein said circuitry for assigning assigns said second spot to one of said unassigned breaks which has a second cost less than a second predetermined amount.

25. The system of claim 23 wherein said relative parameter is selected from the group consisting of: interval of time between said first break and said second break, difference in day part of said first break and day part of said second break, difference between day of the week of said first break and day of the week of said second break, difference between a first product associated with said first spot and a second product associated with said second spot, and combinations thereof.

26. The system of claim 23 further comprising circuitry for assigning ad copy to each of said first and second spots.

27. The system of claim 23 wherein said first spot is associated with a first client and said second spot is associated with a second client.

28. The system of claim 23 wherein said first and second spots are the same.

29. The system of claim 23 wherein said first and second spot are associated with a same contract line.

30. The system of claim 23 wherein said fixed parameter and said relative parameter are each user defined.

31. A system for scheduling, comprising:
a database comprising:
an ordered list of advertising spots ("spots") to be scheduled wherein each spot has an associated scheduling factor, and
a plurality of commercial break locations ("breaks") for one or more networks; and
a microprocessor operatively connected to said database, said microprocessor comprising:
circuitry for selecting a first one of said spots;
circuitry for determining a first cost for each of said breaks as a function of a predetermined algorithm wherein said algorithm determines said first cost as a function of a predetermined fixed parameter, and wherein said fixed parameter is user defined; and
circuitry for assigning said first spot to one of said breaks ("first break") which has a lowest first cost;
wherein said circuitry for assigning said second spot determines that no unassigned breaks have a second cost less than a second predetermined amount thereby preventing said second spot from being assigned to one of said unassigned breaks, determines that said second spot has a ranking greater than a ranking for said first spot, bumps said first spot from said first break, and assigns said second spot to said first break.

32. A system for scheduling, comprising:
a database comprising:
an ordered list of advertising spots ("spots") to be scheduled wherein each spot has an associated scheduling factor, and
a plurality of commercial break locations ("breaks") for one or more networks; and
a microprocessor operatively connected to said database, said microprocessor comprising:
circuitry for selecting a first one of said spots;
circuitry for determining a first cost for each of said breaks as a function of a predetermined algorithm wherein said algorithm determines said first cost as a function of a predetermined fixed parameter, and wherein said fixed parameter is user defined; and
circuitry for assigning said first spot to one of said breaks ("first break") which has a lowest first cost;
wherein said circuitry for assigning said second spot determines that no unassigned breaks have a second cost less than a second predetermined amount thereby preventing said second spot from being assigned to one of said unassigned breaks, determines that said second spot has a ranking less than a ranking for said first spot, places said second spot on an exceptions list, and removes said second spot from said ordered list of spots.

33. The system of claim 32 wherein said circuitry for assigning said second spot assigns said second spot to any one of said unassigned breaks.

* * * * *